US012373495B2

(12) United States Patent
Mahadevan et al.

(10) Patent No.: US 12,373,495 B2
(45) Date of Patent: Jul. 29, 2025

(54) ACTIVE AND PASSIVE QUERYING OF SPATIAL RECORDINGS

(71) Applicant: Autodesk, Inc., San Francisco, CA (US)

(72) Inventors: Karthik Mahadevan, Toronto (CA); Tovi Grossman, Toronto (CA); Fraser Anderson, Newmarket (CA); George William Fitzmaurice, Toronto (CA); Qian Zhou, Toronto (CA)

(73) Assignee: Autodesk, Inc., San Francisco, CA (US)

( * ) Notice: Subject to any disclaimer, the term of this patent is extended or adjusted under 35 U.S.C. 154(b) by 170 days.

(21) Appl. No.: 18/085,386

(22) Filed: Dec. 20, 2022

(65) Prior Publication Data

US 2024/0202245 A1 Jun. 20, 2024

(51) Int. Cl.
*G06F 16/9032* (2019.01)
*G06T 19/20* (2011.01)

(52) U.S. Cl.
CPC ........ *G06F 16/90328* (2019.01); *G06T 19/20* (2013.01)

(58) Field of Classification Search
CPC ................................................. G06F 16/90328
USPC ......................................................... 707/722
See application file for complete search history.

(56) References Cited

U.S. PATENT DOCUMENTS

| 11,836,869 | B1 * | 12/2023 | Alberico | ................. | G06T 17/05 |
| 2007/0070066 | A1 * | 3/2007 | Bakhash | ............ | G06F 3/04845 |
| | | | | | 345/419 |
| 2008/0238916 | A1 * | 10/2008 | Ghosh | ..................... | G06T 19/00 |
| | | | | | 345/419 |
| 2009/0096790 | A1 * | 4/2009 | Wiedemann | ........... | B25J 9/1692 |
| | | | | | 345/427 |
| 2010/0085358 | A1 * | 4/2010 | Wegbreit | ................ | G06T 19/20 |
| | | | | | 345/420 |

(Continued)

OTHER PUBLICATIONS amazon.com [online], "Amazon Transcribe," available on or before Mar. 2, 2022, via Internet Archive: Wayback Machine URL <http://web.archive.org/web/20220302023111/https://aws.amazon.com/transcribe/>, retrieved on Nov. 16, 2022, URL <https://aws.amazon.com/transcribe/>, 6 pages.

(Continued)

*Primary Examiner* — Muluemebet Gurmu
(74) *Attorney, Agent, or Firm* — Fish & Richardson P.C.

(57) ABSTRACT

Methods, systems, and apparatus, including medium-encoded computer program products, for searching through spatial recordings by constructing queries. One of the methods include constructing a query based on input received at a three-dimensional (3D) space displayed at a visual programming interface, wherein the input includes positioning of objects at 3D positions within the 3D space over time, wherein the input defines at least one spatial orientation between at least two objects from the objects in the 3D space; executing the query to search a database of 3D recordings to find at least one segment from at least one 3D recording that includes the at least two objects and matches the spatial orientation between the at least two objects, as defined in the input, at a specific point in time; and presenting the at least one segment from the at least one 3D recording via the visual programming interface.

45 Claims, 12 Drawing Sheets

(56) References Cited

U.S. PATENT DOCUMENTS

2021/0123717 A1* 4/2021 Wierda ................ G06T 7/70
2023/0128422 A1* 4/2023 Li ........................ G10L 15/24
                                                                              345/156

OTHER PUBLICATIONS

Arkio.is [online], "Arkio," available on or before Apr. 6, 2022, via Internet Archive: Wayback Machine URL <http://web.archive.org/web/20220406224358/https://www.arkio.is/>, retrieved on Nov. 16, 2022, URL <https://arkio.is>, 16 pages.

Bergman et al., "DocWizards: a system for authoring follow-me documentation wizards," Proceedings of the 18th Annual ACM Symposium on User Interface Software and Technology, Oct. 2005, pp. 191-200.

Brudy et al., "EagleView: A Video Analysis Tool for Visualising and Querying Spatial Interactions of People and Devices," Proceedings of the 2018 ACM International Conference on Interactive Surfaces and Spaces, Tokyo, Japan, Nov. 2018, pp. 61-72.

Büschel et al., "Miria: A Mixed Reality Toolkit for the In-Situ Visualization and Analysis of Spatio-Temporal Interaction Data," Proceedings of the 2021 CHI Conference on Human Factors in Computing Systems, Yokohama, Japan, May 2021, retrieved from URL <https://dl.acm.org/doi/fullHtml/10.1145/3411764.3445651>, 30 pages.

Bustos et al., "Feature-based similarity search in 3D object databases," ACM Computing Surveys, Dec. 2005, 37(4):345-387.

Chen et al., "Text2Shape: Generating Shapes from Natural Language by Learning Joint Embeddings," arXiv:1803.08495v1, submitted on Mar. 22, 2018, 35 pages.

Chow et al., "Challenges and Design Considerations for Multimodal Asynchronous Collaboration in VR," Proceedings of the ACM on Human-Computer Interaction, Nov. 2019, 3(CSCW):40, 24 pages.

Danyluk et al., "A Design Space Exploration of Worlds in Miniature," Proceedings of the 2021 CHI Conference on Human Factors in Computing Systems, Yokohama, Japan, May 8-13, 2021; ACM, 2021, 21 pages.

Dragicevic et al., "Video browsing by direct manipulation," CHI '08: CHI Conference on Human Factors in Computing System, Florence, Italy, Apr. 5-10, 2008; Proceedings of the SIGCHI Conference on Human Factors in Computing Systems, Apr. 2008, pp. 237-246.

Fisher et al., "Characterizing structural relationships in scenes using graph kernels," SIGGRAPH '11: Special Interest Group on Computer Graphics and Interactive Techniques Conference, Vancouver, British Columbia, Canada, Aug. 7-11, 2011; SIGGRAPH '11: ACM Siggraph 2011 papers, Aug. 2011, 34:1-11.

Fisher et al., "Example-based synthesis of 3D object arrangements," ACM Transactions on Graphics, Nov. 2012, 31(6), 11 pages.

Funkhouser et al., "A search engine for 3D models," ACM Transactions on Graphics, Jan. 2003, 22(1):83-105.

Giunchi et al., "3D sketching for interactive model retrieval in virtual reality," Expressive '18: Proceedings of the Joint Symposium on Computational Aesthetics and Sketch-Based Interfaces and Modeling and Non-Photorealistic Animation and Rendering, 2018, Victoria, British Columbia, Canada, Aug. 17-19, 2018, 11 pages.

Goldfeder et al., "Autotagging to improve text search for 3D models," Proceedings of the 8th ACM/IEEE-CS Joint Conference on Digital Libraries, Jun. 2008, 355-358.

Grabner et al., "3D Pose Estimation and 3D Model Retrieval for Objects in the Wild," 2018 IEEE/CVF Conference on Computer Vision and Pattern Recognition, Salt Lake City, UT, USA, Jun. 2018, 3022-3031.

Grabner et al., "Location Field Descriptors: Single Image 3D Model Retrieval in the Wild," arXiv:1908.02853v1, submitted Aug. 7, 2019, 18 pages.

Grossman et al., "Chronicle: capture, exploration, and playback of document workflow histories," UIST '10: Proceedings of the 23rd annual ACM symposium on User interface software and technology, Oct. 2010, pp. 143-152.

Guimbretiére et al., "ExperiScope: an analysis tool for interaction data," Proceedings of the SIGCHI Conference on Human Factors in Computing Systems, San Jose, California, USA, Apr. 2007, 1333-1342.

Holz et al., "Data miming: inferring spatial object descriptions from human gesture," Proceedings of the SIGCHI Conference on Human Factors in Computing Systems, Vancouver, BC, Canada, May 2011, 811-820.

Hubenschmid, "ReLive: Bridging In-Situ and Ex-Situ Visual Analytics for Analyzing Mixed Reality User Studies," Proceedings of the 2022 CHI Conference on Human Factors in Computing System, New Orleans, LA, USA, Apr. 29,-May 5, 2022, retrieved from URL <https://dl.acm.org/doi/fullHtml/10.1145/3491102.3517550>, 38 pages.

Igarashi et al., "Teddy: a sketching interface for 3D freeform design," SIGGRAPH06: Special Interest Group on Computer Graphics and Interactive Techniques Conference, Boston, MA, USA, Jul. 30,-Aug. 3, 2006; ACM SIGGRAPH 2006 Courses, Jul. 2006, pp. 409-416.

Karrer et al., "Dragon: a direct manipulation interface for frame-accurate in-scene video navigation," CHI '08: Proceedings of the SIGCHI Conference on Human Factors in Computing Systems, Apr. 2008, pp. 247-250.

Kloiber et al., "Immersive analysis of user motion in VR applications," The Visual Computer, Oct. 2020, 36:1937-1949.

Krauss et al., "Nonverbal Behavior and Nonverbal Communication: What do Conversational Hand Gestures Tell Us?" Advances in Experimental Social Psychology, Elsevier, 1996, 389-450.

Krosnick et al., "Think-Aloud Computing: Supporting Rich and Low-Effort Knowledge Capture," Proceedings of the 2021 CHI Conference on Human Factors in Computing Systems, Yokohama, Japan, May 2021, 14 pages.

Lee et al., "An Empirical Study of How Socio-Spatial Formations are Influenced by Interior Elements and Displays in an Office Context," Proceedings of the ACM on Human-Computer Interaction, Nov. 2019, 3(CSCW):58, 26 pages.

Lilija et al., "Who Put That There? Temporal Navigation of Spatial Recordings by Direct Manipulation," Paper 477, 2020 CHI Conference on Human Factors in Computing Systems, Honolulu, HI, USA, Apr. 25-30, 2020; CHI '20: Proceedings of the 2020 CHI Conference on Human Factors in Computing Systems, Apr. 2020, 1-11.

Lobo et al., "Flex-ER: A Platform to Evaluate Interaction Techniques for Immersive Visualizations," Proceedings of the ACM on Human-Computer Interaction, Nov. 2020, 4(ISS):1-20.

Lun et al., "3D Shape Reconstruction from Sketches via Multi-view Convolutional Networks,"arXiv:1707.06375v3, revised Sep. 29, 2017, 11 pages.

Luo et al., "Towards 3D VR-Sketch to 3D Shape Retrieval," 2020 International Conference on 3D Vision (3DV), Fukuoka, Japan, Nov. 2020, 81-90.

Matejka et al., "Ambient help," Proceedings of the SIGCHI Conference on Human Factors in Computing Systems, May 2011, pp. 2751-2760.

Merrell et al., "Interactive furniture layout using interior design guidelines," SIGGRAPH '11: Special Interest Group on Computer Graphics and Interactive Techniques Conference, Vancouver, British Columbia, Canada, Aug. 7-11, 2011; SIGGRAPH '11: ACM SIGGRAPH 2011 papers, Aug. 2011, 10 pages.

Mulloni et al., "Indoor navigation with mixed reality world-in-miniature views and sparse localization on mobile devices," Proceedings of the International Working Conference on Advanced Visual Interfaces—AVI '12, Capri Island, Italy, May 2012, 5 pages.

Nam et al., "Worlds-in-Wedges: Combining Worlds-in-Miniature and Portals to Support Comparative Immersive Visualization of Forestry Data," 26th IEEE Conference on Virtual Reality and 3D User Interfaces, VR 2019—Proceedings, Osaka, Japan, Mar. 2019, pp. 747-755.

Nebeling et al., "MRAT: The Mixed Reality Analytics Toolkit," Proceedings of the 2020 CHI Conference on Human Factors in Computing Systems, Honolulu, HI, USA, Apr. 2020, 12 pages.

Nguyen et al., "Direct manipulation video navigation in 3D," Proceedings of the SIGCHI Conference on Human Factors in Computing Systems, Paris, France, Apr. 2013, pp. 1169-1172.

(56) References Cited

OTHER PUBLICATIONS nkba.org [online], "NKBA Kitchen & Bathroom Planning Guidelines Handbook," available on or before Dec. 13, 2021, via Internet Archive: Wayback Machine URL <http://web.archive.org/web/20211213204024/https://store.nkba.org/products/nkba-kitchen-bathroom-planning-guidelines-handbook>, retrieved on Nov. 16, 2022, URL <https://store.nkba.org/products/nkba-kitchen-bathroom-planning-guidelines-handbook>, 3 pages.

Ohbuchi et al., "Shape-similarity search of 3D models by using enhanced shape functions," International Journal of Computer Applications in Technology, Jan. 2005, 23(2-4):70-85.

Pausch et al., "Navigation and locomotion in virtual worlds via flight into hand-held miniatures," Proceedings of the 22nd Annual Conference on Computer Graphics and Interactive Techniques—SIGGRAPH '95, Sep. 1995, pp. 399-400.

Pu et al., "A 2D Sketch-Based User Interface for 3D CAD Model Retrieval," Computer-Aided Design and Applications, Jan. 2005, 2(6):717-725.

reddit.com [online], "Reddit—Dive into anything," available on or before Apr. 7, 2022, via Internet Archive: Wayback Machine URL <http://web.archive.org/web/20220407064911/https://www.reddit.com/>, retrieved on Nov. 17, 2022, URL <https://www.reddit.com/>, 4 pages.

Reimers et al., "Sentence-BERT: Sentence Embeddings using Siamese BERT—Networks," arXiv:1908.10084, submitted Aug. 27, 2019, 11 pages.

Savva et al., "PiGraphs: learning interaction snapshots from observations," ACM Transactions on Graphics, Jul. 2016, 35(4):139, 12 pages.

Savva et al., "SceneGrok: inferring action maps in 3D environments," ACM Transactions on Graphics, Nov. 2014, 33(6):1-10.

secondspectrum.com [online], "Second Spectrum," available on or before Feb. 12, 2022, via Internet Archive: Wayback Machine URL <http://web.archive.org/web/20220212025924/https://www.secondspectrum.com/index.html>, retrieved on Nov. 17, 2022, URL <https://www.secondspectrum.com/index.html>, 5 pages.

Spatial.io [online], "Spatial—Metaverse Spaces That Bring Us Together," available on or before Dec. 16, 2021, via Internet Archive: Wayback Machine URL <http://web.archive.org/web/20211216035157/https://spatial.io/>, retrieved on Nov. 17, 2022, URL <https://spatial.io/>, 6 pages.

Stemasov et al., "ShapeFindAR: Exploring In-Situ Spatial Search for Physical Artifact Retrieval using Mixed Reality," CHI Conference on Human Factors in Computing Systems (CHI '22), New Orleans, LA, USA, Apr. 29-May 5, 2022; ACM, 2022, retrieved from URL <https://dl.acm.org/doi/fullHtml/10.1145/3491102.3517682>, 12 Pages.

Stoakley et al., "Virtual reality on a WIM: interactive worlds in miniature," Proceedings of the SIGCHI Conference on Human Factors in Computing Systems—CHI '95, Denver, Colorado, United States, May 1995, 265-272.

strivr.com [online], "Strivr | Enterprise Virtual Reality Training Solutions," available on or before Dec. 19, 2021, via Internet Archive: Wayback Machine URL <http://web.archive.org/web/20211219225015/https://www.strivr.com/>, retrieved on Nov. 17, 2022, URL <https://www.strivr.com/>, 13 pages.

thewild.com [online], "The Wild—VR Collaboration for Architecture & Design Teams," available on or before Dec. 7, 2021, via Internet Archive: Wayback Machine URL <http://web.archive.org/web/20211207031120/https://thewild.com/>, retrieved on Nov. 17, 2022, URL <https://thewild.com>, 7 pages.

virti.com [online], "Virti | Improving Human Performance," available on or before Feb. 16, 2022, via Internet Archive: Wayback Machine URL <http://web.archive.org/web/20220216020855/https://www.virti.com/>, retrieved on Nov. 17, 2022, URL <https://www.virti.com/>, 7 pages.

vrchat.com [online], "VRChat," available on or before Mar. 2, 2022, via Internet Archive: Wayback Machine URL <http://web.archive.org/web/20220302075700/https://hello.vrchat.com/>, retrieved on Nov. 17, 2022, URL <https://hello.vrchat.com>, 5 pages.

Walkerdine et al., "WorldFinder: A tool for finding Virtual Worlds," Working Paper (Unpublished), 2000, 14 pages.

Wang et al. "Again, Together: Socially Reliving Virtual Reality Experiences When Separated," Paper 513, Proceedings of the 2020 CHI Conference on Human Factors in Computing Systems, Honolulu, HI, USA, Apr. 2020, pp. 1-12.

Wang et al., "Sketch-based 3D Shape Retrieval using Convolutional Neural Networks," 2015 IEEE Conference on Computer Vision and Pattern Recognition (CVPR), Boston, MA, USA, Jun. 7-12, 2015; arXiv:1504.03504v1, submitted Apr. 14, 2015, 9 pages.

Xia et al., "Spacetime: Enabling Fluid Individual and Collaborative Editing in Virtual Reality," Proceedings of the 31st Annual ACM Symposium on User Interface Software and Technology, Oct. 2018, pp. 853-866.

xrdr.org [online], "XRDRN—XR Distributed Research Network," available on or before Dec. 5, 2021, via Internet Archive: Wayback Machine URL <http://web.archive.org/web/20211205161223/http://www.xrdr.org/>, retrieved on Nov. 17, 2022, URL <http://www.xrdm.org/>, 10 pages.

Yoon et al., "Sketch-based 3D model retrieval using diffusion tensor fields of suggestive contours," Proceedings of the International Conference on Multimedia—MM '10, Firenze, Italy, Oct. 25-29, 2010; ACM, 2010, pp. 193-200.

\* cited by examiner

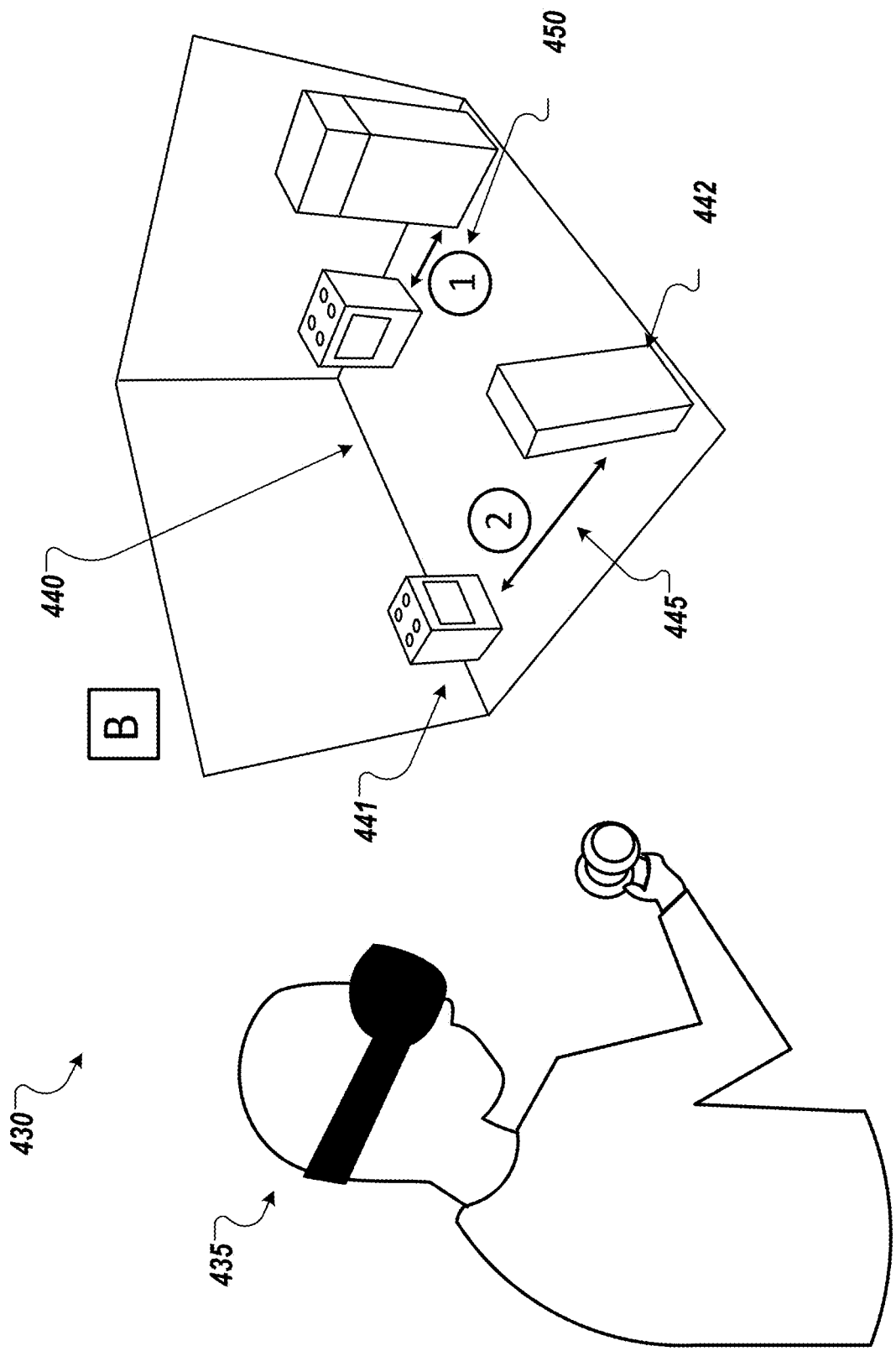

ACTIVE AND PASSIVE QUERYING OF SPATIAL RECORDINGS

BACKGROUND

This specification relates to virtual reality (VR) design tools and searching techniques that can be used in computer graphics applications, such as computer-generated animation and/or computer-aided design of physical structures and/or other visualization systems and techniques.

A virtual reality (VR) environment can be supported by different types of devices that can be used for providing interactive user input (e.g., goggles, joy sticks, sensor-based interaction supporting tools, pencils, touch pads, gloves, etc.). By utilizing the interactive techniques and tools supported by a VR environment, e.g., VR collaboration platform, users are able to work independently or in cooperation with other users within the same and/or in different three-dimensional space over one or more projects.

SUMMARY

This specification relates to searching through spatial recordings by constructing queries in a visual programming interface to define objects and their spatial orientation as query rules. This spatial-record querying can be used in computer graphics applications, such as computer generated animation, collaborative interior design, building and/or site design and/or construction management, computer-aided design of physical structures, and/or other visualization systems and techniques.

In particular, this specification describes a method including constructing a query based on input received at a three-dimensional (3D) space displayed at a visual programming interface, wherein the input includes positioning of objects at 3D positions within the 3D space over time, wherein the input defines at least one spatial orientation between at least two objects from the objects in the 3D space; executing the query to search a database of 3D recordings to find at least one segment from at least one 3D recording that includes the at least two objects and matches the spatial orientation between the at least two objects, as defined in the input, at a specific point in time; and presenting the at least one segment from the at least one 3D recording via the visual programming interface.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented to realize one or more of the following advantages. In some implementations, a visual reality interface can support interactive techniques to obtain input and to construct a query based on the input. Defining input for querying 3D recordings in space and time based on tools and techniques provided by the visual reality interface can support faster query definition and execution. The visual reality interface can be used to perform a stage-based search to retrieve moments of interest in spatial recording by intuitively defining a 3D scene by manipulating objects and/or behavior of avatar(s) of user(s). Real-time interactions with visual input during definition of queries can improve the user experience and support more efficient searching with a higher query definition precision. The visual nature of the query definition can reduce the resources needed to interpret a query (e.g., for example a query defined with a text query definition). By utilizing the interactive techniques and tools supported by the visual interface platform, users are able to work independently or in cooperation with other users within the same environments over one or more projects.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 4B shows an example of a process to execute an object search based on automatic detection of relationships between objects in a 3D space for constructing a query in accordance with implementations of the present disclosure.

Like reference numbers and designations in the various drawings indicate like elements.

DETAILED DESCRIPTION

Figure 1:
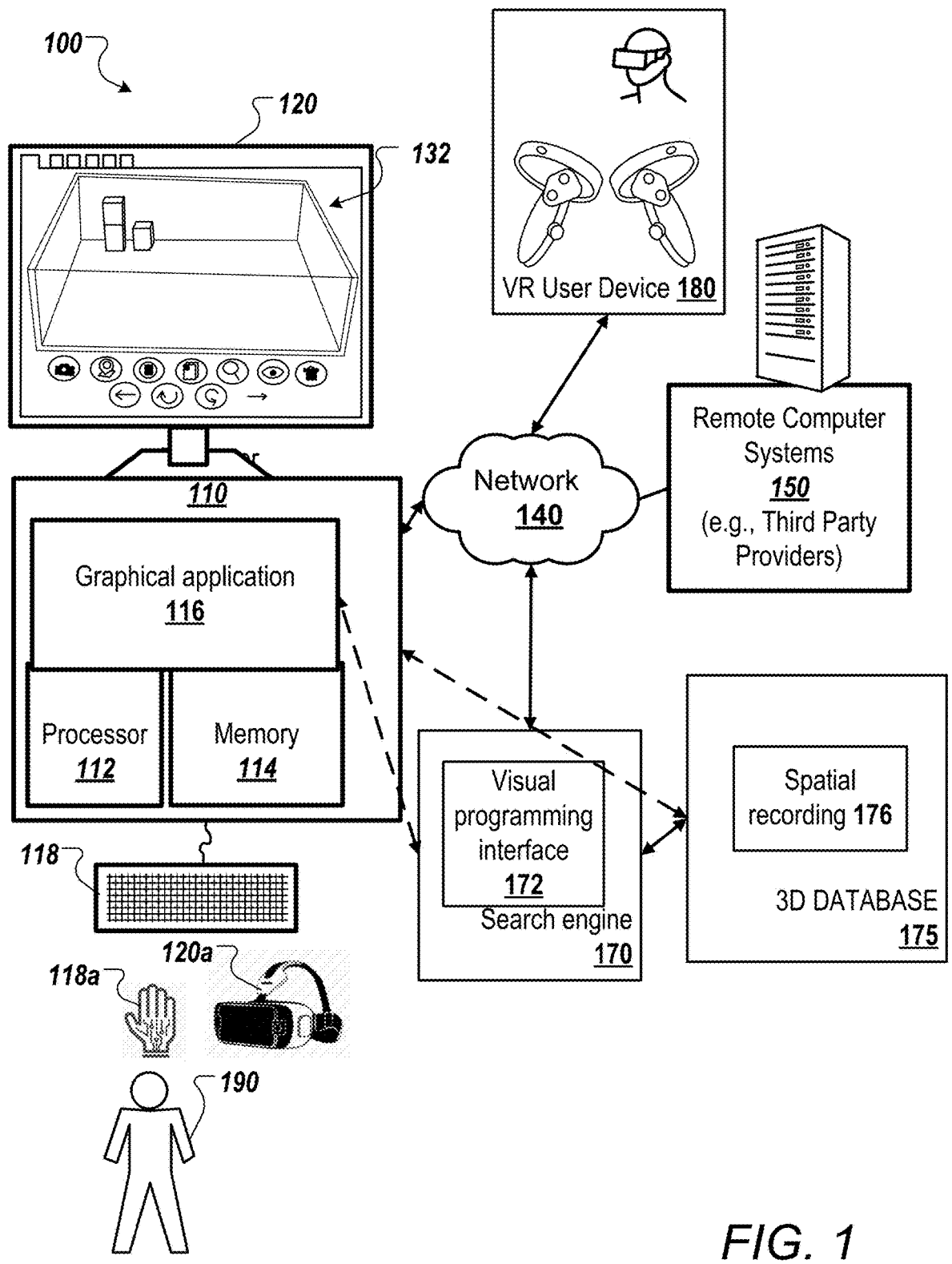
FIG. 1 shows an example of a system usable to support querying of spatial recording through a visual programming interface that is world-in-miniature-based, allowing definition of queries in a 3D search space, such as a search cube, in accordance with the implementations of the present disclosure.

The present disclosure describes various tools and techniques for searching through spatial recordings by constructing queries via a visual programming interface. The queries can be defined in a three-dimensional (3D) space via the visual programming interface, where objects can be defined with their spatial orientations and location, which can be used to search for similar spatial recordings from a database of spatial recordings. This spatial-recording querying can be used in the context of computer graphics applications, such as computer-generated animation, collaborative interior design, building and/or site design and/or construction management, computer-aided design of physical structures, and/or other visualization systems and techniques. In some implementations, spatial recordings can be VR or non-VR recordings. The spatial recordings can capture motion, orientation, position, and voice of objects, such as physical items or avatars of recorded people that are captured over time and space. The spatial recordings that are non-VR recordings can be volumetric recordings that capture motion, positioning, and voice (conversation), for example, those can be recordings of video games. Spatial recordings can include more information than a typical screen recording as they can capture interaction with the user's environment including location of the user, posture, gaze, and gestures. In some implementations, spatial recordings can be recordings captured from augmented reality (AR) and/or mixed reality (MR) environments and systems, where one or multiple users can interact in a spatial scene.

Spatial recordings can be made for tasks performed in a 3D environment, such as an interior design task in a design environment, playing a game in a video-gaming environment, collaborative document sharing in design setup, among other examples of tasks involving motion and objects (such as avatars) in the 3D space.

Virtual reality collaborative design tools allow for communication between users interacting through the tools in a virtual reality (VR) 3D space. The communication within these design tools can be captured and recorded as spatial recordings. Such spatial recordings can be previewed afterwards and/or can be used for further manipulation and editing. VR tools support productive execution of meetings, training for real-world activities, collaborative spatial design, and social activities (e.g., chat). During the execution process of such meetings, spatial recordings can be captured to include data about users and environment (space).

In accordance with implementations of the present disclosure, a visual programming interface is provided to support searching through space and time of stored spatial recordings by providing tools and techniques to define a query within the 3D space (e.g., a search cube) via the visual programming interface. The visual programming interface can receive input as a visual query definition based on insertion and manipulation of objects and the behavior of the user's avatars in the 3D space. In some implementations, the received input can be direct input for manipulating objects within the 3D space, or the received input can be based on observation and copying of manipulations performed in another design environment (e.g., based on the observation and identification of relevant moments, and direct copying of all manipulations performed in the other design environment, among other examples of rules for performing mirroring of one design environment into another 3D space).

In some implementations, the visual programming interface can provide a toolbox for users to define and/or express their search intent as direct input. The visual programming interface can be a virtual reality world-in-miniature-based interface. The visual programming interface can receive direct interaction from objects within a 3D space, for example, based on a single user or multiple users interacting with the objects within the 3D space, or can be a shared environment that can be accessed through multiple application instances and based on separate interaction tools and devices to perform a collaborative design task in the 3D space. In some implementations, a user can incorporate an object from the real world (e.g., a fridge) into the visual programming interface to express an intent to search for that real-world object in stored spatial recordings. For example, a user can interact with the visual programming interface based on use of one or more user devices (e.g., goggles and controllers, consoles, joystick and microphone, among other example options of devices or combinations of devices) that can allow capture of the user's intention to identify an object. For example, the user can provide input to define a query in the visual programming interface through a device such as a console and/or motion and audio sensors to detect actions of the user, such as movement, voice command, gesture, among other examples of human interactions that can be captured and evaluated by the visual programming interface (e.g., based on installed and configured sensors).

In some implementations, the visual programming interface can obtain data from another design environment and use it as if it was received as direct input for manipulation of objects within the 3D space. The visual programming interface can receive the data for manipulations from the other graphics environment as a sequence of actions over time or as a single copy operation for positioning objects in the 3D space.

Computer graphics applications include collaborative design applications (e.g., for interior design tasks) which include different software products and/or services that support the work of a single user or the work of multiple users in a remote work setup. In some cases, remote users and/or on-site groups of users can work in parallel (or substantially in parallel, or synchronously) on a design project (e.g., design document) that they view and/or edit to provide a collaborative result. During such collaboration, users can create content and improve or adjust a design (e.g., a design can include objects positioning in a 3D space) over time to consider different design options and perform their display reviews which can support decision making, among other examples.

In some implementations, a graphic environment used in the context of a design process of organizing objects within a 3D space can be connected to the visual programming interface, and can provide input automatically, based on a preconfigured synchronization mechanism, or direct instruction to copy, among other examples. The graphic environment can serve as the design space where direct user input is obtained and that input can be translated to the visual programming interface to execute a query and to identify one or more spatial recordings that may have matching content (e.g., objects, positioning, viewpoints) and which can be further used in graphic design tasks or for further adjustments to specify subsequent queries. For example, a similar recording can be identified and copied via the visual programming interface for further modification (e.g., addition of objects, exclusion of objects, modification of positioning, etc.) to define new input that can be used for executing a search.

In some implementations, the input received via the visual programming interface can include statuses for some or all of the objects, such as an inclusion status, prioritization status, object characteristics requirement (e.g., a fridge with an ice machine, red velvet coach, etc.). Such status information can be parsed from the input and used for constructing a query to search for similar spatial records.

In some implementations, a query can be defined based on the input and executed to retrieve segments of recordings that match the query criteria. Recordings stored in a database can be generally free from a viewpoint once they are created, and/or can be associated with multiple viewpoints related to different users associated with the recording (e.g., different users interacting with a 3D space on a collaboration design task). These recordings can be searched to match the query, where the query can be defined from a viewpoint defined in the 3D space of the visual programming interface. When the search is executed on the spatial videos that can be considered to be viewpoint agnostic, the retrieved segments as results from the queries can be visualized for the user via the visual programming interface from the viewpoint of the 3D space where the input was received. The resulting segments can be spatial clips of a fixed length that can be visualized in a layout to the user of the visual programming interface.

In some implementations, the input can be provided over a period of time and the input can be considered as multiple instances of queries defined for a predefined set of time (e.g., overlapping instances), which can be used to determine matching segments from spatial recordings. As such, a segment that results from a query can match a portion of the input provided via the visual programming interface. Configurations for interpreting the input to define one or multiple sets of sub-input to execute a query can be defined via the visual programming interface. For example, a query can be split into sub-portions matching a predefined timeframe, e.g., 15 seconds, and those sub-portions can be used to search spatial recordings to identify matching segments from one or more spatial recordings that match at least one of the sub-portions of the input.

FIG. 1 shows an example of a system 100 usable to support querying of spatial records, where the queries are defined through a visual programming interface that captures object positioning and behavior of actors in a 3D scene over time and space. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including VR programs, Augmented Reality (AR) programs, Mixed Reality (MR) programs, and/or collaborative graphic design programs.

The computer 110 can be communicatively coupled to a VR user device 180, which can be a standalone computing device that can be used to interact with the computer 110, with other systems, and with a search engine 170. In some implementations, the VR user device 180 can be used by a first user to provide input to a 3D space of the visual programming interface 172 while the first user is interacting with a second user in the same 3D space, where the second user uses the computer 110 to provide input in the 3D space through the visual programming interface 172. In some implementations, the first user can use the VR user device 180 and the second user can use an interactive tool, such as a joystick, mouse, motion sensors, or a VR toolset such as a glove 118a and/or a VR headset 120a to interact with the first user in the context of defining a 3D scene in a 3D space provided by a visual programming interface 172 of a search engine 170. The defined 3D scene can be considered by the visual programming interface 172 as input that can trigger execution of queries at the 3D database 175 in accordance with implementations of the present disclosure.

In some implementations, a user of the VR user device 180 (alone or during interactions provided from other users through other devices such as through the computer 110) can provide input to request execution of queries at databases through the network 140. The system 100 can be used by one or multiple users interacting with the visual programming interface 172 to define a query to search a 3D database 175, where the query can be defined as a solo or collaborative task. The visual programming interface 172 can be configured to receive direct input from connected devices, such as the VR user device 180 and/or the computer 110, for example, based on interactions through the graphics application 116 that receives direct interactions based on user tools such as a keyboard 118, VR headset 120a, glove 118a, or else.

In some instances, the computer 110 and/or the VR user device 180 can be used by a user, such as a user 190 or another user, to collaborate or work independently on a design task of a 3D scene. During the design of the 3D scene and to support the design process, pre-existing spatial recordings can be used to generate an end-result (a particular design scene involving a number of objects in a particular setup and positioning within a period of time). The 3D database 175 is connected to the network 140 and can provide content in the form of spatial recordings 176. These spatial recordings 176 can be searched to identify one or more recordings that can be used in the content of a design task.

In some implementations, the spatial recordings 176 of the 3D database 175 can be searched based on a query that is defined as a 3D scene via the visual programming interface 172. The search can be executed to identify matching content from existing spatial recordings with a defined 3D scene as a query, either through the computer 110 or the VR user device 180.

In some implementations, the visual programming interface 172 can construct a query to search for matching recordings from the 3D database based on a received query input. Once the search is executed by the search engine 170, a matching recording can be provided, as a whole or as a portion thereof, e.g., a 15 second video clip, to be previewed by a user of the computer 110 or the VR user device 180. The provided search result recording can be reused to generate a designed 3D scene, such as the one defined for the query, to generate computer animations or movies, and to generate video clips based on reproducing events and views from the real world which can be modified based on (at least) portions of pre-existing spatial recordings that match the designed 3D scene as input for querying via the visual programming interface 172.

In some implementations, the system 100 can be usable to display data, for example, data from the 3D database that comes out as a result from a search or from a direct request for data from the 3D database. The system 100 can be usable to display 3D recordings as portions of a spatial recording or as a whole. The system can support display of such spatial recordings or segments thereof via the display device 120 connected to the computer 110, through the VR headset 120a connected to the computer 110, or by the VR user device 180 that can serve as a standalone computer with rendering capabilities of the spatial recordings from the 3D database 175 in a VR display environment. The display of a spatial recording or a segment of a recording can be provided through the visual programming interface 172 that was used for constructing the query to find a matching spatial recording. Once a recording or a segment of a recording is displayed to a user, the user can be allowed to use the 3D videos to navigate, modify, adjust and search, among other interactive operations that can be performed with the data presented.

In some implementations, users, including user 190, can rely on different rendering technology and different user interactive input/output environments to connect, access and interact in the same virtual world as the one that can be displayed by the display device 120. Thus, the system can support interconnected user interfaces that can render a virtual world where multiple users interact, either at the same geo-location or at remote locations. The users can have a different presentation of the 3D videos and models based on the type of graphic rendering that they are relying on (e.g., VR devices, display screens, etc.) when rendering a spatial recording.

The computer 110 includes a graphics application 116 that includes implemented logic to help users involved in a design task (as a solo task or a collaborative task) to achieve their goals. The graphics application 116 can be the front-end logic of a platform engine that can run locally on the computer 110, remotely on a computer of one or more remote computer systems 150 (e.g., one or more third party providers' one or more server systems accessible by the computer 110 via the network 140) or both locally and remotely. In some implementations, the graphics application 116 can be an access point for accessing services provided by a search engine 170 to search for similar spatial recordings stored in a 3D database 175.

In some implementations, the graphics application 116 can be used in an interior design context. The graphics application 116 can be an interior design application that can be used to facilitate creation of spatial recording, such as the spatial recordings stored in the 3D database 175. Spatial recordings, such as those created through the graphics application 116 can be provided for storage in the 3D database 175 and can be used later on for querying according to one or more of the querying techniques described throughout the present disclosure.

In some implementations, the graphics application can be used by multiple users to furnish a virtual space. For example, users can navigate the space with standard VR interactions such as teleporting with their controller. The graphics application 116 can support features such as addition, deletion, and arrangement of objects (e.g., ranging from kitchen appliances to living room furniture) within a design space (e.g., 3D space of a room). The graphics application 116 can provide measuring tools and techniques as well as simulation of operating objects (e.g., the opening and closing of appliances such as a dishwasher). The graphics application 116 can support capturing of multimodal events and actions performed by avatars representing recorded people and/or objects, conversations performed by avatars representing recorded people, and in-application events. The performance of actions in relation to one or more objects performed by one or more users acting with their avatars can be recorded and supplied to the 3D database 175 for use for searching and navigating within portions of the recordings related to further design work or other positioning of objects in 3D space that can benefit from finding relevant examples in stored spatial recording.

A user 190 can interact with the graphics application 116 to work on a graphic representation (a computer-generated representation) of a physical world, which can include both a to-be-built physical structure and a pseudo-structure, such as an architect's office, meeting room, house, kitchen, bedroom, etc., which can be generated based on collaborative work with one or more other users. In some implementations, the graphics application 116 can provide a user interface 132 on a connected display device 120 to display a generated design document shared with a set of users or to display a 3D space for defining input within a visual programming interface 172 that can be used to construct a query and execute it via the search engine 170 in the 3D database 175. The rest of the users can receive a shared view of the document at different instances of the collaboration application 116.

In some implementations the graphics application 116 can display the visual programming interface 172 on a display device 120 connected to the computer 110. The graphics application 116 can receive direct interactions within a 3D space provided by the visual programming interface 172 to define queries that can be executed at the 3D database 175.

In some implementations, the graphics application 116 can be connected to the search engine 170 to replicate content generated by the graphics application 116. The graphics application 116 can be a user interface of a graphic design application that can be used by one or more users, such as user 190, based on actions performed through different user device tools, including a mouse, a keyboard 118, a glove 118a, or a VR headset 120a. The actions provided to the graphics application 116 can be actions to design a 3D space (e.g., in the context of an interior design task) performed by a single user or a group of users working collaboratively on a design task. In some implementations, input provided into the graphics application 116 can be mirrored into the visual programming interface 172 to passively trigger a search based on constructing a query according to the copied input. In some implementations, the input from the graphics application 116 can be simultaneously, in portions, or as a whole, copied into the visual programming interface 172 to initiate query construction. In some instances, the way of transferring data from the graphics application 116 to the visual programming interface 172 can reflect the type of searches that can be available to be performed by the search engine 170. In some cases, by replicating data in a simultaneous manner, a time aspect of the provided input can be captured and relied upon during the construction of a query. In some other cases, the time aspect can be captured at the graphics application 116 and then can be transferred, e.g., as metadata, together with a portion or the whole of the 3D scene defined at the graphics application 116.

In some implementations, the visual programming interface 172 can be accessed by a user, such as the user 190, either through a computer connection with the computer 110 or through a direct connection with a VR user device 180. The visual programming interface 172 can receive input and interactions from users to define queries for execution in the 3D database(s) 175. The visual programming interface 172 can additionally or instead send queries to another configured database that stores spatial recordings that can be searched through the techniques implemented at the search engine 170 and based on queries constructed according to input received at the visual programming interface 172.

The collaboration application 116 can present the user interface 132 on the display device 120 and multiple user interaction elements as part of the user interface 132 to support collaborative activities, such as entering and engaging with the virtual world and the avatars of others therein, opening a document, sharing your view, sharing a desktop view, presenting a conference (e.g., an audio and/or video conference), or engaging in a chat function, receiving and providing information to other users, interacting with other users, among other examples.

In some implementations, the computer 110 can include or be part of a VR or AR system. For example, the input/output devices 118, and 120 can include a VR/AR input controller, gloves, or other hand manipulating tools (e.g., glove 118a and/or a VR/AR headset 120a). In some instances, the input/output devices can include hand-tracking devices that are based on sensors that track movement and recreate interaction as if performed with a physical input device. In some implementations, VR and/or AR devices can be standalone devices that may not need to be connected to the computer 110.

The systems and techniques described herein are applicable to any suitable application environment that can graphically render any portion of the visual programming interface, including the objects therein. Thus, in some implementations, the graphics application 110 and/or the VR user device 180 can be used to collaborate on defining a query via the visual programming interface 172. In such collaborative query definition, a user working with the VR user device 180 can have one viewpoint of the 3D space of the visual programming interface, and a user working through the graphics application 116 can have a different (or substantially different) viewpoint of the 3D space. Thus, two users can share the query definition task and can define their input from a different perspective. The visual programming interface 172 can obtain input from one or more users and interpret the input to execute different searches based on different search techniques considering objects, proximity, time, viewpoints and voice instructions to perform searches at the 3D database 175.

Figure 2A:
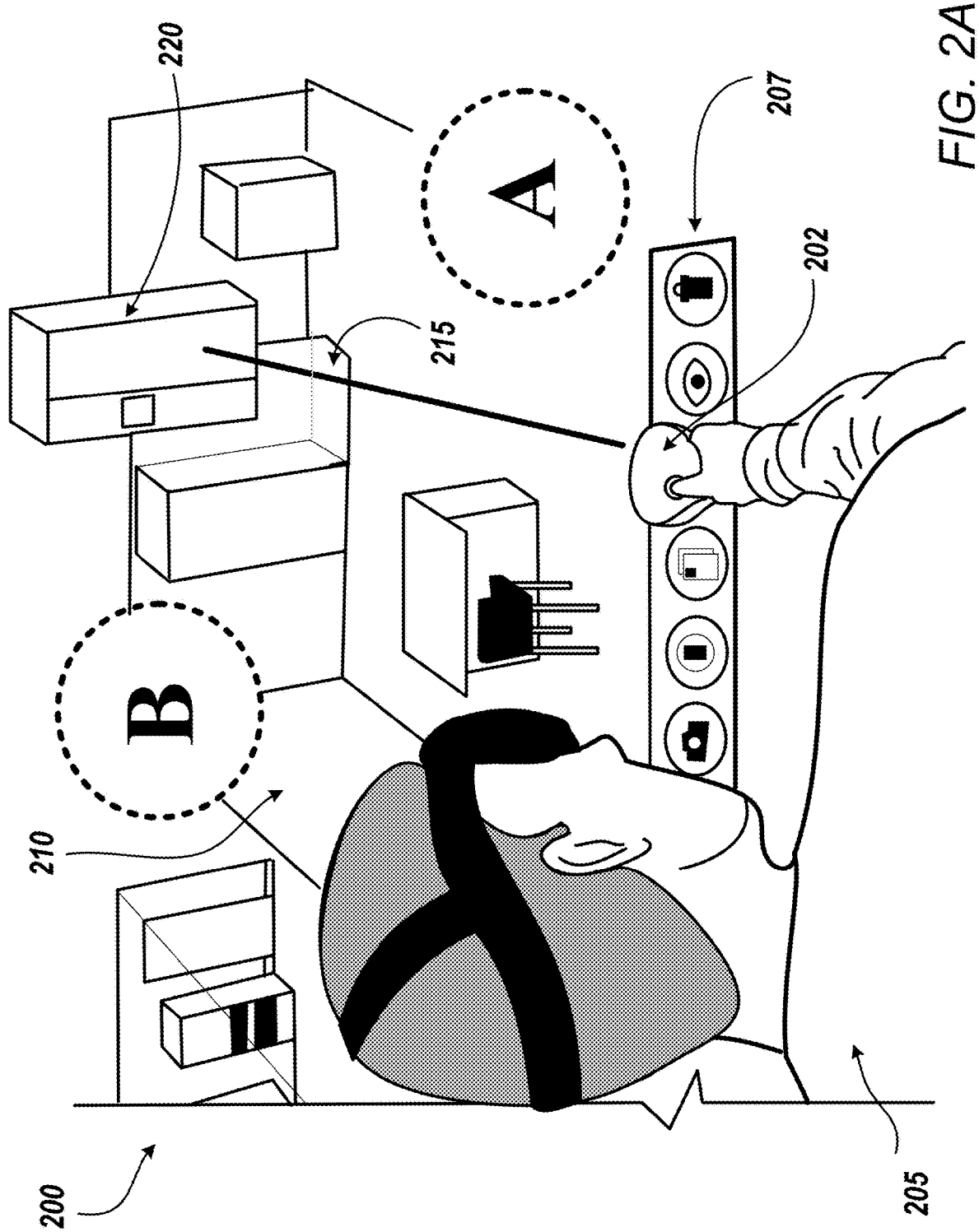
FIG. 2A shows an example of a process to use a visual programming interface to add objects from an environment to construct and execute queries in accordance with implementations of the present disclosure.

FIG. 2A shows an example of a process 200 to use a visual programming interface 210 to add objects from an environment to construct and execute queries in accordance with implementations of the present disclosure. In some implementations, the visual programming interface 210 can be substantially similar to the visual programming interface 172. The visual programming interface 210 can be a world-in-miniature (WIM) based VR interface that can support searching of spatial recordings of collaborative design activities.

A user 205 can interact with the visual programming interface 210 by using one or more tools from a toolbox 207 to manipulate objects and define behavior of avatars representing recorded people in the defined 3D space in the visual programming interface 210. The visual programming interface can allow the user 205 to search through space and time by forming queries using an interaction concept that allows manipulation of objects in the 3D space or definition of the behavior of avatars representing recorded people such as proximity of avatars to one or more objects, their viewpoints, or their speech, to retrieve relevant search results from a 3D database, such as the 3D database 170 of FIG. 1. For example, the toolbar 207 can include interactive options to define a viewpoint search, proximity search, voice search, or other search type. In some implementations, defining a search of a particular type can include providing input that is to be used for a search execution. Further, the toolbar 207 can include interactive options to initiate a copy operation of the current environment as presented on the visual programming interface 210, to hide the content of the visual programming interface 210 (e.g., including input for a query to be executed), to delete the content defined in the visual programming interface 210, and/or initiate a start of a query execution.

In some implementations, the visual programming interface 210 supports querying techniques for users to express their search intent. The toolbox 207 can be provided as a web search bar that includes tools to be used by users to add and manipulate 3D objects in a 3D space, for example, a search cube. The addition and manipulation of 3D objects can be performed to define a query, through direct input in the 3D space, thus to retrieve relevant moments from spatial recordings stored at a database which can be queried.

In some implementations, users can define what they intend to find through a set of active and passive querying techniques. Active querying techniques can allow users to explicitly stage queries, within the visual programming interface 210, by directly manipulating objects in the 3D space and defining geometric relationships between the objects. The definition of the objects and their geometric relationships can be used to perform an object search to find one or more spatial recordings which have a matching spatial clip that overlaps for (at least) a predefined period of time with the input obtained from the visual programming interface.

For example, the user 205 can use the visual programming interface 210 as a container 3D space to stage spatial queries by defining content inside the space. The user can directly manipulate objects and the behavior of avatars representing recorded people. The visual programming interface 210 can provide a third-person view of visualization that can be a viewpoint used when executing a query. Thus, the defined query can be agnostic to the view of the separate users collaborating on defining the query in the 3D space. The query can be defined from a viewpoint configured for the 3D space that may or may not match a viewpoint of a user who interacted with the 3D space to provide an object. Thus, when a query is defined to be view-agnostic, the navigation problems of spatial recordings in which users move freely in a first-person view but lack the option to see events occurring outside of their viewpoint perspective can be overcome.

In some implementations, users can also define the behavior of avatars representing recorded people by manipulating their position, movement, and topics of conversation, and can execute proximity, viewpoint, and voice searches to identify spatial recordings that match the defined behavior.

In some implementations, the visual programming interface can support execution of passive querying techniques that leverage information about the user's activity in a separate design environment (not shown on FIG. 2A) to propose relevant clips. In contrast to the active querying, and as discussed in relation to FIG. 1, the passive querying can work by observing and mirroring (e.g., in portions, in full, sequentially, etc.) a design context such as a design layout, the user's position, and actions to suggest spatial recordings that may be relevant to the current design activity to inform design decisions and considerations from past recordings.

In some implementations, the visual programming interface 210 allows a user to select objects, such as a fridge 220, from the environment and place it into the 3D space of the visual programming interface at location 215. The visual programming interface serves as a container for users to stage spatial queries, which can be executed, for example, by engaging with an active querying button on the toolbox 207 or pressing a button on a controller 202.

In some implementations, the user can define a query through a VR headset (includes goggles and sensors) and a controller. The user can press an activation button on the controller 202 to bring up the visual programming interface as a 3D space for query definition, which can be visualized to the user through the VR goggles.

In some implementations, the user can add objects from their current environment (e.g., a kitchen) by pointing and selecting objects, such as a fridge 220, with the trigger initiated through the controller 202. By positioning the pointer from the controller 202 inside the 3D space of the visual programming interface, the user drops the selected object at a particular 3D position. Objects in the visual programming interface can be selected individually or in groups using the trigger initiated from the controller. The objects can be selected and repositioned by pointing to them with the controller, rotating them using a thumb stick, or deleting them using a selection button on the controller. Within the visual programming interface, there is a toolbox 207 with multiple icons to access an active querying technique, to zoom-in on objects in the query, to define viewpoints for actors in the 3D space, to copy a query result in the 3D space, to remove spatial clips identified through querying, among other examples. The toolbox 207 can provide options to connect and copy a connected environment of the user (e.g., that is being currently used by the user) into the 3D space to passively initiate a query based on interactions of the user in the connected environment.

Figure 2B:
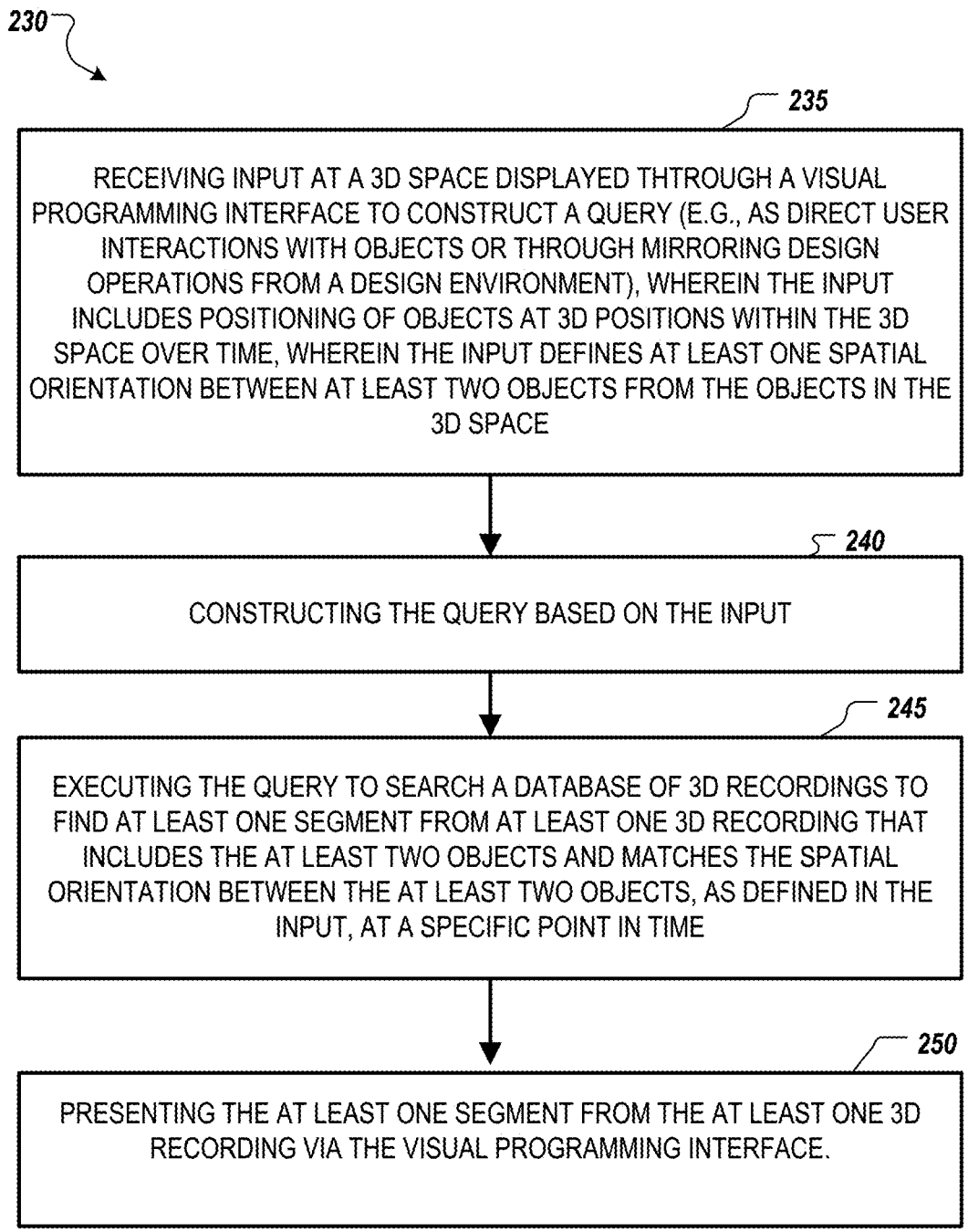
FIG. 2B shows an example of a process to construct a query based on three-dimensional (3D) space input in accordance with implementations of the present disclosure.

FIG. 2B shows an example of a process 230 to construct a query based on three-dimensional (3D) space input in accordance with implementations of the present disclosure. In some implementations, the process 230 can be executed at a collaboration platform providing a visual programming interface to construct a query that can be based on input such as the provided input described in FIG. 2A.

At 235, the input is received through the visual programming interface (e.g., visual programming interface 210 of FIG. 2A). In some implementations, the input can be received as direct user interactions with the objects in the 3D space or through mirroring design operations from a related design environment. The received input can be used to construct a query to search for matching spatial recordings.

In some implementations, the visual programming interface can provide a 3D space, for example, a search cube space, where direct interactions can be performed by users to position objects relative to one another in the space. In some implementations, the direct user interactions are performed to stage a query in the 3D space that is to be executed to search for similar spatial recordings from a 3D database. During the query staging, the direct user interactions can be performed with each of the objects to position each object relative to the other object(s) during construction of the query over a period of time.

In some implementations, the visual programming interface can obtain input as mirroring of actions performed by one or more users in a design space, where the actions of the users include positioning of objects within a 3D space. The mirroring can include copying of the design content from the design space into the visual programming interface, where such copying can be considered as a passive initiation to query a database for similar spatial recordings.

In some implementations, the input received via the visual programming interface can have space and time aspects. For example, input for multiple objects can be provided simultaneously or sequentially, where at different points in time during input submission, different objects are included and positioned (e.g., in static or moving places) in the 3D space. In some implementations, the input can be used to search for spatial recordings that have substantially similar content over time. The input can include positioning of one or more objects at respective 3D positions within the 3D space over time, for example, at a first time point, one object such as a stove is included at position A, and at a second time point, a second object such as a fridge is included at position B.

The received input defines at least one spatial orientation between at least two objects from the set of objects provided with the input. The spatial orientation can be associated with at least a single time point that can be identified (automatically) based on the received input. For example, there is a time point (or a time range) during providing the input, where two objects, such as a stove and a fridge are positioned one next to the other.

At 240, a query is constructed based on the received input. The query can be constructed based (at least) on extracting information for the 3D positions of the objects in the 3D space as identified based on the input. In some implementations, the query can be constructed based on different search techniques considerations including defining a query to identify one or more segments of spatial recordings that at least include a matching set of objects positioned in the segment substantially similar to the positioning in a segment (e.g., within predefined threshold distances and/or ratios and considering differences in dimension and shape of the 3D space).

In some implementations, different searching techniques can be supported by the visual programming interface including an object search, a proximity search, a viewpoint search, and/or a voice search, where these searches can be executed in an active setup in which the user has defined a 3D scene in the 3D space of the interface with the goal of querying, or in a passive setup where the 3D space of the interface receives a copy of a mirrored interface of a related application of the user where one or more users work on designing a 3D scene. In some implementations, the visual interface supports definition of 3D scenes to serve as input for a query to be executed in a database of spatial recordings. A 3D scene can include positioning of objects in 3D positions within the 3D space over time while the user provides the input in the interface. As a 3D scene, the defined input can define at least one spatial orientation between at least two objects from the set of objects defined in the 3D scene at one or more time points which can be identified from the input.

At 245, the query is executed to search a database of 3D recordings to find at least one segment from at least one 3D recording that includes the at least two objects and matches the spatial orientation between these two objects as defined in the input at least at the single time point identified from the input. In some implementations, spatial recordings that are searched can be divided into segments, e.g., fifteen-second samples, and those segments can be used for scoring based on a query type that is executed, e.g., implicitly or explicitly requested by a user. During querying, segments from the 3D database can be scored according to rules implemented for a particular search type that is executed (e.g., object search, proximity search, viewpoint search, voice search, etc., or combination of one or more of available types).

In some implementations, the object searching techniques can allow a user to define objects' relationships by manipulating them in the 3D space of the interface to define a scene that is used to query a 3D database of spatial recordings. The objects included in a 3D space can be identified are mapped to a respective tag, such as, fridge, stove, window, chair, door, etc. When the user adds objects to the 3D space (e.g., a search cube), the visual programming interface can interpret the addition of object as an implied querying for spatial recordings, clips, or portions thereof that are relevant to objects that are tagged with the same tag as the objects in the query. Thus, when a query is executed, segments of 3D recordings can be evaluated to compute object score relevance to determine whether the segment corresponds to the defined object query in the 3D space.

For example, for a segment, a score can be computed as follows:

$$\text{obj\_score} = \frac{\sum_{i=1}^{N} I_{R\_met}(w)_i}{N} - \frac{R_{not}}{N}$$

$$I_{R\_met}(w)_i = \begin{cases} 1 & \text{if realtionship\_WIM}_i = \text{relationship\_segment}_{j \in \{1,...,M\}} \\ 0 & \text{otherwise} \end{cases},$$

where R not equals the number of relationships found that should not be present in a segment that is scored. For example, those relationships can correspond to case where an object that is not included in the query (or an object that is identified in the query as not to be included) is found in a segment during scoring, or a prioritized object is not found. In the score computation formula, N represents a total number of relationships defined in the 3D space based on the presence of objects and other relationships. M represents a total number of relationships found in a given segment of a spatial recording.

In some implementations, segments can be sampled for a predefined number of times over a schedule (e.g., every three seconds) to compute a similarity score between the query and a current segment. The object search logic is configured to match tags of objects identified in the query to object in a segment, where the matching may be performed for a set of combinations of objects defined in the query or for all combinations of objects' presence (e.g., might be associated with more computational resources). In some implementations, the visual programming interface can detect changes across segments and provide a single segment as a matching segment rather than returning multiple results with the same or similar layouts in static segments. In some cases, when there are duplicate relationships (e.g., multiple instance of an object) found in a segment, only a single relationship can be considered, for example, the first one evaluated.

In some implementations, proximity search techniques can allow a user to define a recorded person's location (avatar's location) and distances to objects included in the 3D scene. When a proximity search is applied, for each segment in the recording, a relative proximity score can be computer for each avatar of a recorded person, for each segment. For example, the calculation of the relative proximity score can be as follows $$\text{rec\_person\_rel\_prox\_score} = \frac{\sum_{i=1}^{N} I_p(w)_i}{N}$$

$$I_p(w)_i = \begin{cases} 1 & \text{if } \alpha * \text{dist}(\text{selection}_{disk}, \text{search cube object}_i) \leq \\ & \text{dist}(\text{rec}_{person}, \text{object}_{j \in \{1,...,M\}}) \\ 0 & \text{otherwise} \end{cases}.$$

In the above formula, N represents the number of objects found within proximity of the resizable selection disk to objects inside the search cube, a represents the constant scaling factor between objects in the search cube and their actual size in the recording, and M represents the total number of objects found in the respective segment of the recording.

In some implementations, a disk area can be placed in a 3D space used to stage a query that is to be executed according to proximity search techniques. For each object near the disk area, that is a selection area, the visual programming interface can be configured to compare their scaled distance to the distance of the avatar representing a recorded person to a full-sized object with the same tag as the tag identified for the object in the 3D space near the disk area. If the distance is less than or equal to a threshold distance value, the object can be considered as a match for the proximity search considerations. In some implementations, the query can be staged by multiple users presented with avatars in the 3D space, and in those cases, the score that can be taken can be the maximum score from the scores of all the avatars.

In some implementations, absolute proximity in each segment can be computed by taking the position of each avatar of a recorded person at different points of time during a respective segment. The absolute proximity score can be calculated according to the following formula:

$$\text{rec\_person\_abs\_prox\_score} = \max \frac{1}{1 + \text{dist}\left(\text{recorded\_user\_position}(t)_{t \in \{1,...,T\}}, \frac{\text{selection\_disk\_position}}{\alpha}\right)}$$

$$\text{rec\_prox\_score} =$$

$$\alpha_{rel} * \text{rec\_person\_rel\_prox\_score} + \alpha_{abs} * \text{rec\_person\_abs\_prox\_score}$$

Here, αrel and αabs represent the weighting factors of the relative and absolute proximity search terms. T is the total number of moments when an avatar of a recorded person is present in the respective segment.

In some implementations, it can be possible to enable both relative and absolute proximity score as a combination to produce a search result and their contribution to the overall score can equal or can be adjusted to define different weight values for each of the proximity scores taken in the combination (e.g., 0.3 and 0.7; 0.2, and 0.8, etc.). If the 3D space is associated with receiving input from multiple users, substantially similar to the proximity search, the score that is highest can be taken.

In some implementations, the user can place a disk into the 3D space and objects in close proximity to the disk can be evaluated. The objects can be input into a stack structure, where the stack can be updated if an object or a disk is modified (e.g., moved, added, removed, etc.) from the 3D space. For each segment, the interface logic can be configured to check for objects with the same tag as those of objects in the 3D space. The distance between an object and an avatar of a recorded person can be computed. If the distance is within a predefined (scaled) threshold of the distance between the disk center and nearby objects within the 3D space (e.g., the distance can be scaled down to map to a relative distance in the small 3D space representation), a match is found for relative proximity. Similar to the object search technique, the proximity search can be performed at predefined time intervals within a segment. The best scoring interval can be chosen as the segment's score. Absolute proximity can be compared with the scaled distance of the selection disk position to the recorded user's position at various times in the segment.

The viewpoint search techniques can support querying 3D scenes where recorded people in the scene have a particular viewpoint towards one or more other objects in the scene. Voice search techniques can enable executing a search to find related moments from spatial recordings where speech was uttered, such as a recorded conversation, providing the input for the query. Proximity and viewpoint search techniques can be inherently based on object searches as they are based on searching for objects defined in the 3D scene, however, they can provide additional options to define and search for behavior of recorded actors in the 3D scenes. Further, passive querying can mirror a generated user design from content in a design application and implicitly use it to stage a query as a replicated 3D scene based on the content in the design application and search for similar spatial recordings that can have similar design content to the one generated by the user in the design application. In some implementations, passive querying can be triggered based on an event identification, where the event can be identified at the design application, or at an external event hub that pulls data from a design space at the design application and based on a predefined logic triggers passive querying and mirroring of content to define a query.

In some implementations, from the input that is collected over time at the visual programming interface, for each viewpoint representing an avatar of a recording person that is added to the 3D space of a visual programming interface (e.g., search cube), the interface can determine which objects are to be considered inside the 3D space for each frame that is collected. Within each segment, each recorded score associated with an avatar is computed per frame by simulating what the avatar of the recorded person might have seen at given time points or within time interval using their recorded poses. The score can be calculated according to the following formula:

$$\text{rec\_person\_cam\_score\_frame}_k = \frac{\sum_{i=1}^{N} I_c(w)_i}{N}$$

$$I_c(w)_i = \begin{cases} 1 & \text{if visible}_{object_i} = rec\_person_{visible_{object_{j \in \{1,\ldots,M\}}}} \\ 0 & \text{otherwise} \end{cases}$$

In the above formula, N represents the number of objects that the added viewpoint can see inside the search cube and M represents the number of objects visible to a recorded person (based on simulation). The score can be computer per frame, and matches can be determined based on evaluating the score to determine whether an object is visible from an avatar's view point. If an object is in the avatar's field of view (e.g., considered after projecting the object into a camera plane), the object can be considered visible and a match (e.g., one or more frames corresponding to a segment, multiple segments, or recording(s)) can be found.

When there are multiple recorded persons, the below formula can be used:

$$\max_{k \in \{1,\ldots,K\}} (\text{rec\_person\_cam\_score\_frame}_k)$$

Figure 6:
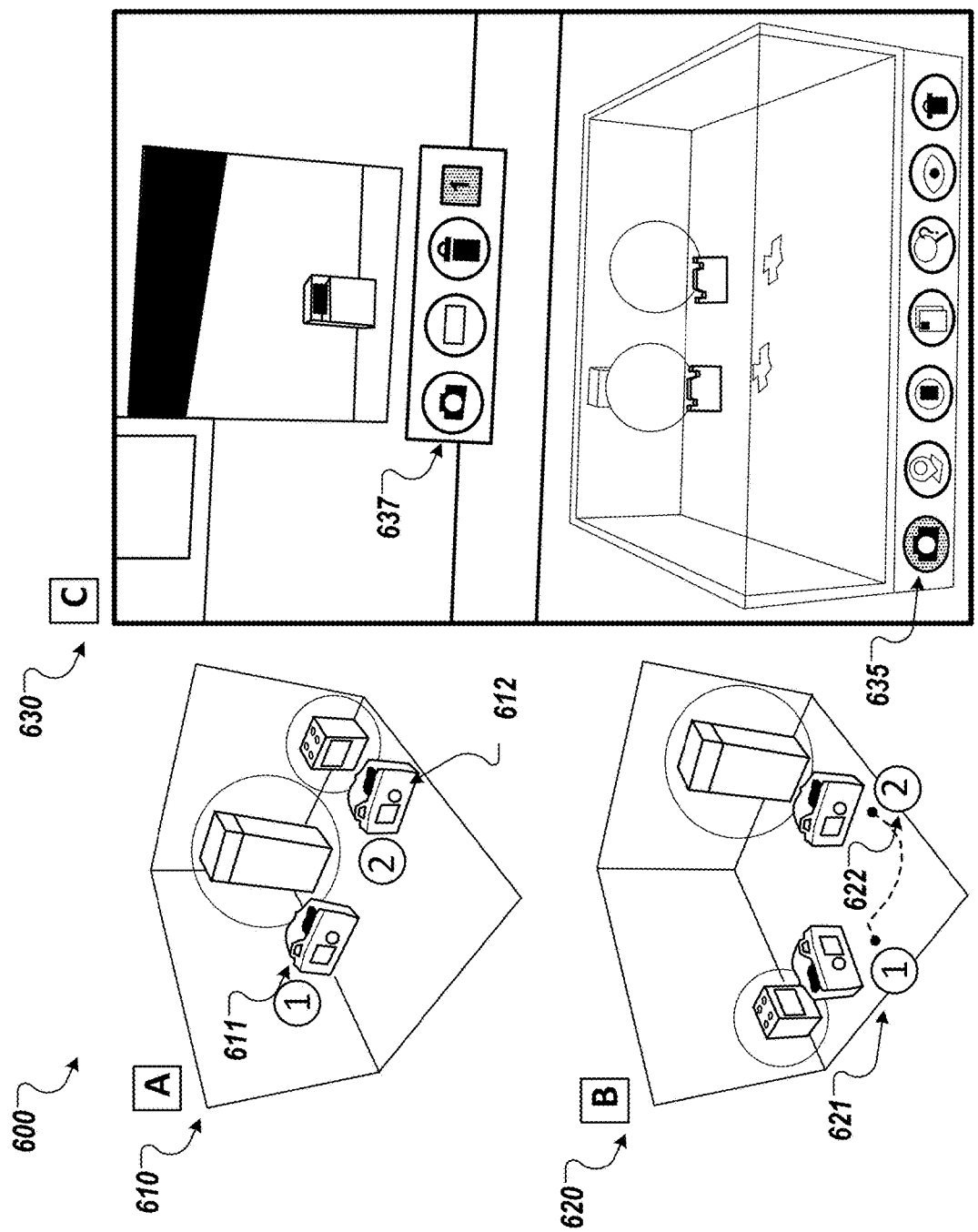
FIG. 6 shows an example of a process to execute viewpoint search techniques associated with multiple viewpoints in accordance with implementations of the present disclosure.

In some implementations, when a 3D space of the interface includes multiple avatars corresponding to multiple recorded people and cameras on each frame, the searching to find a match can rely on all permutations of cameras to recorded avatars, where n can be the number of camera, and r can be the number of people. Thus, the best scoring permutation $\max(n_{p_r})$ can be used to select the best assignment of cameras to persons. For example, in the case of two recorded avatars (R1, R2) and two cameras (C1, C2), there are two combinations (R1-C1, R2-C2 or R1-C2, R2-C1). FIG. 6 shows an example of a process to execute viewpoint search techniques associated with multiple viewpoints in accordance with implementations of the present disclosure.

In the cases where there are multiple frames and one camera defined within a 3D space of the interface, the result with a highest sum from multiple frames such that each subsequent frame occurs after the previous can be provided according to the below formula:

$$rec\_person\_cam\_score_k = \max \left( \sum_{i}^{M} rec\_person\_cam\_score_{frame_i} \right)$$

where $$i < i+1 < i+2 < \ldots < i + \text{num\_frames} - 1$$

For example, if there are three frames in the sequence (F1, F2, F3), the segment with the highest scoring sum (F1+F2+F3) with the ordering (F1<F2<F3) is chosen. If there are multiple recorded avatars in a query, the scoring takes into account the total number of avatars when comparing with frame(s). When executing a search for each segment of a recording(s), a simulation of what each avatar representing a recorded person(s) might have seen at a defined interval or time points can be performing using avatar's recorded poses. For example, if an object seen by an avatar of a recorded person in a segment has the same tag as an object seen by the viewpoint inside the 3D space's defined input, then the segment matches the query and can be returned as a result. In some implementation, to reduce computations expenditure, a single frame from a segment can be considered when there are multiple camera in a segment, or when multiple frames are evaluated, only a single camera can be considered.

In some implementations, voice search techniques can include conversation searching that can be performed by computing a similarity score between an input user's search phrase and a phrase(s) in the recording. In some implementations, sentence embeddings can be generated for a phrase(s) in recordings. By using the sentence embeddings and all phrases identified in recordings from the searched 3D database, a similarity score can be computer. For example, the similarity score can be Cosine similarity that can be computed according to the below formula:

$$\text{conv\_score} = \max_{i \in \{1,\ldots,N\}}(\cos(\text{query phrase, clip phrase}_i))$$

In the above formula, N represents the total number of phrases (or sentences) uttered in a recording (or segment thereof). For each segment, a score can be determined that can categorize the segment as either including a conversation or not, for example, classified as an "event" or "conversation."

In some implementations, passive searching techniques can rely on computations of scores for matching of an input (provided as passive input to implicitly initiate a query) to an embedding(s) from a recording in the 3D database. In some implementations, a score for each avatar representing a segment (or recording) can be computed according to the below formula:

$$\text{passive\_rec\_person}_j = \frac{1}{3}(\text{obj\_score} + \text{rec\_person\_proximity\_score} + \text{event score})$$

$$\text{event\_score} = \sum_i^N \frac{I_E(w)_i}{N}$$

$$I_E(w)_i = \begin{cases} 1 & \text{if user\_event}_i = \text{recording\_event}_{j \in \{1,\ldots,M\}} \\ 0 & \text{otherwise} \end{cases}$$

In the above formula, N represents a number of events that are captured by passive querying in a current period (e.g., a time period associated with the generated input for the query), while M represents the number of events captured in the segment (or recording). In cases where there are multiple users in a segment, the highest score for a recorded avatar is selected. Object score can be computed in the context of a passive query in a substantially similar way as the score computed for an object querying technique. In some implementations, when a passive query is received, the objects in the 3D space can be considered as those to be used for the querying. In some instances, the relationships defined between objects and for statuses of objects, such as prioritized or not, present or not, among other options, can be ignored for performing an object search, or can be considered based on evaluation of the manually added status or relationship at the 3D space where the 3D scene is mirrored from another connected design space.

For example, if a user has a fridge in their 3D space input for executing the passive query, a best match can be determined for a segment from the recordings in a 3D database that is a segment where an avatar of a recorded person adds a fridge in the recording. In such case, the event for the addition of an object can be matched as well as the object (e.g., based on the object tag). In the context of passive querying, a proximity score can be computed substantially similarly to scores computed in active proximity searches. In some cases, a distance can be considered with respect to the avatar as recorded in the user's environment rather than the distance with respect to a selection disk in the search cube.

At 250, the at least one segment from the at least one 3D recording in the visual programming interface is displayed. In some implementations, the presentation of one or more segments from the results can be performed as described further at for example, FIG. 2C, FIG. 3, and FIG. 5B.

Figure 2C:
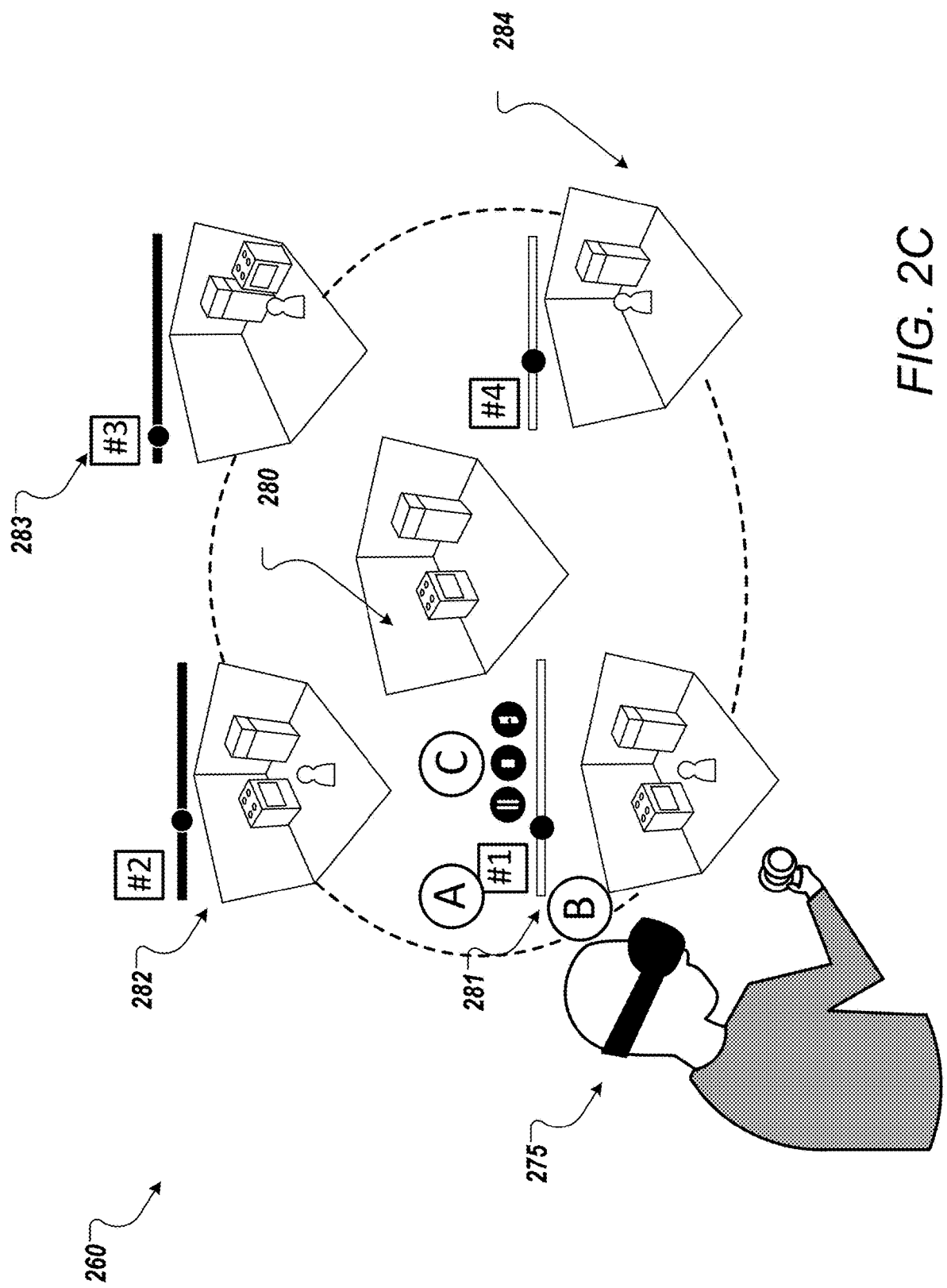
FIG. 2C shows an example of a process to visualize search results from executing a query defined through a visual programming interface as a 3D scene, where the search results are visualized as spatial clips associated with rankings of their similarity to the query in accordance with implementations of the present disclosure.

FIG. 2C shows an example of a process 260 to visualize search results from executing a query defined through a visual programming interface 280 as a 3D scene, where the search results are visualized as spatial clips associated with rankings of their similarity with the query in accordance with implementations of the present disclosure.

In some implementations, a search input for constructing a query can be provided through a visual programming interface 280 (e.g., a search cube). The search input, for example, can include a stove and a fridge that are positioned in a 3D scene of a cube shape, where the stove and the fridge have positions that can be evaluated and determined to be spatially oriented as "across from" each other, as their position is not aligned on the same side of the cube.

A query can be executed based on the input from a user 275 in the search cube 280 in a 3D database, as discussed in relation to 3D database 170 of FIG. 1 and in relation to FIG. 2B. Based on execution of the query, results in the form of segments from spatial recordings can be retrieved, where the segments match portions of the input over a predefined time period (e.g., a fixed time length). In general, the input for the search can be provided over time, where the time aspect of the addition of the objects to the search cube can be considered when searching through spatial recordings in the 3D database. The retrieved segments resulting from the querying can be visualized in a radial layout to the user 275. The radial layout can be presented around the visualization of the search cube, which appears in the middle, so that it matches the viewpoint of the user 275. The radial layout can include a set of result segments which can be provided with a rank to identify their similarity to the scene defined in the search cube 280 with the two objects spatially oriented as across from each other. The first ranked segment is segment 281, which is a spatial clip that can be played by the user 275 (e.g., based on a user interaction to trigger the play through a user menu provided next to the visualized clip (e.g., above the clip as shown for 281)). Each or some of the visualized results 281, 282, 283, and 284 can be provided with additional data such as time, origin of recordings, author, etc. Further, the visualized results can be provided with medial playback controls, which can be shown upon engagement of the user 275 with one of the results (e.g., pointing to the particular clip with the controller or movements identified through the headset). The first ranked clip is the one which was found to have the highest similarity scope. The ranking can be visualized with colors to visually facilitate the distinction of the results that are closest to the query and those that are further from the query. The clips within the radial layout can be provided including a timestamp as an additional label.

Further, the radial layout used for showing the retrieved results can be navigated to browse the results and go into different details and preview settings for a given result segment. The radial layout can visualize the result segments in a sorted manner based on the determined ranking scores. The user 275 can be provided with options to investigate one of the result clips, such as result segment 281, where the user 275 can expand the view and can also copy the segment into the search cube 280. By copying the segment in the search cube 280, the user 275 can define further queries, e.g., based on further modifications of the clip in the search cube space.

The different search results include one or more of the objects defined in the search cube 280, where those search results that are relatively similar to the search cube query are those which include the two objects and match their positioning and spatial orientation. For example, the third ranked segment 283 does include the two objects, however, those two objects are in a different spatial orientation than the one defined in the search cube query. The different segments presented can result from performing searches that apply the object, viewpoint, proximity, and voice techniques to identify segments that match at least some of the requirements of the query as identified by the input (e.g., the objects, the objects and their position, the objects and their orientation) whether that is defined through navigation or manipulation of objects within the search cube and/or through voice commands that are tracked at the search cube 280.

Figure 3:
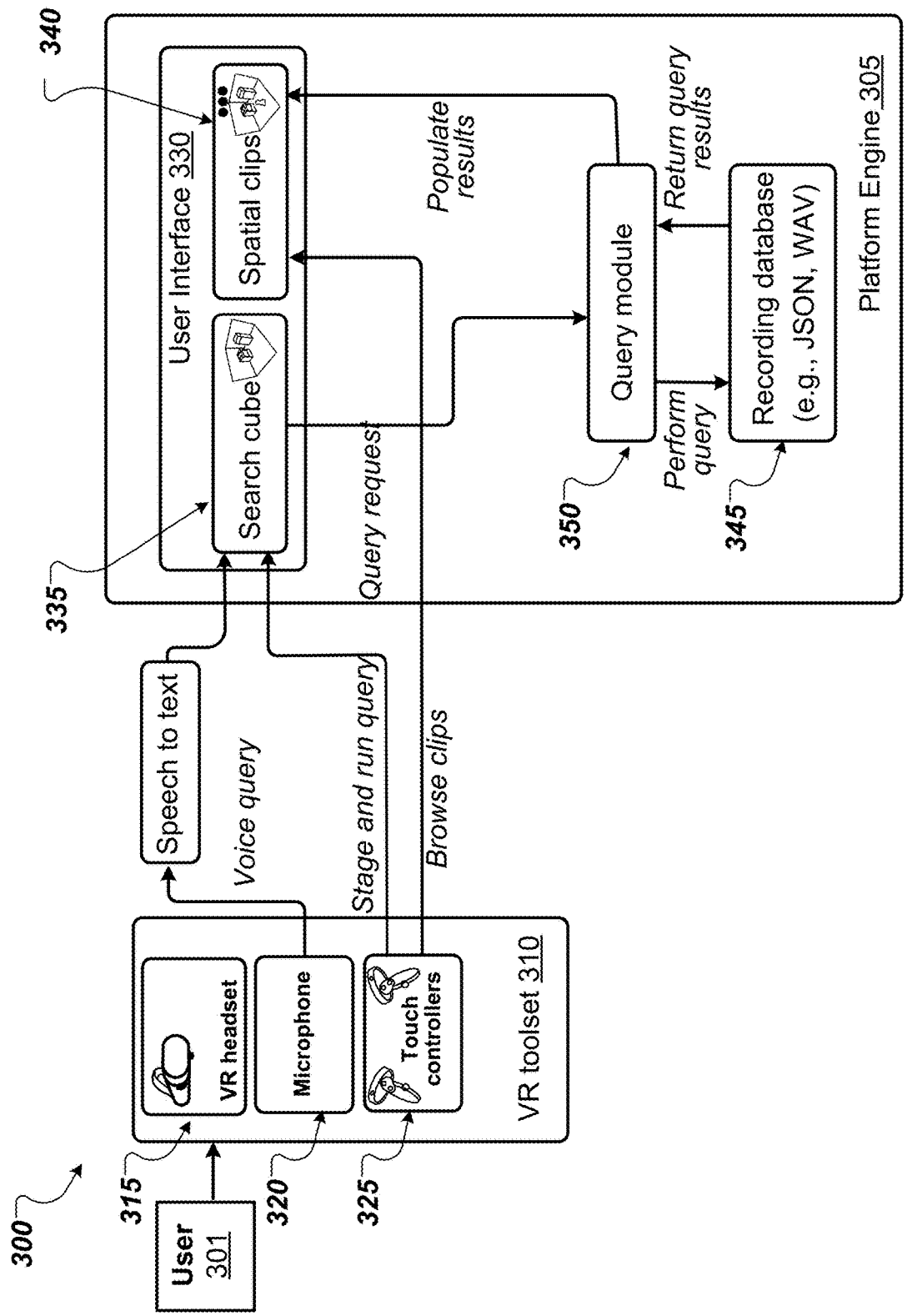
FIG. 3 shows an example of a system implementing a visual programming interface that supports query constructions based on 3D space input in accordance with implementations of the present disclosure.

FIG. 3 shows an example system 300 implementing a visual programming interface that supports query constructions based on 3D space input in accordance with implementations of the present disclosure. In some implementations, the visual programming interface can be implemented as a search cube 335 that is displayed through a user interface 330 of a platform engine 305. The platform engine 305 can be substantially similar to the search engine 170 of FIG. 1, where the search cube 335 can correspond to the visual programming interface 172. Further, the search cube 335 can be substantially similar to the search cube 210 of FIG. 2A or the search cube 280 of FIG. 2C. The search cube 335 can receive user input, for example, through a VR toolset 310. The VR toolset can be used by a user 301 who can manipulate objects in the search cube 335 based on instructions provided as gestures, motions with touch controllers 325, as voice instructions through a microphone 320, or by utilizing tools, buttons and techniques to send signals for manipulations of objects in the search cube 335. The user 301 can use the VR headset 315 to visualize the search cube 335 as a virtual reality environment, where VR headset 315 can be configured to support the user interactions thought visualization and motion detection. For example, the user 301 can initiate a search query based on sending a voice command to the search cube 335 that can be used at the search cube 335 as input to position objects. For example, the user 301 can send an instruction such as "Add a round table in the middle of a room," which can be interpreted by the search cube as an instruction to search for segments in spatial recordings in a connected database for moments (or periods) of time where there are recordings that include such a round table in a room.

In some implementations, the search cube 335 can be connected to a recordings database 345 which can store spatial recordings that can be browsed to identify relevant segments from recordings that match queries. In some implementations, the recording database 345 can be hosted outside of the platform engine 305 and/or the search cube can be associated with another database that can provide further spatial recordings, where based on a received query at the search cube 335, multiple databases can be queried.

In some implementations, once a query is defined in the search cube, based on input to stage the query received through one or more of the VR tools in the VR toolset 310, the search cube 335 can request a query at the querying module 350.

To support the retrieval of spatial recordings (or segments thereof), each spatial recording in the recordings database 345 can be divided into fixed-length segments (e.g., fifteen-second segments). The objects in the spatial recordings can be labeled with searchable and pre-defined tags, such as, "refrigerator", "oven," "sink," etc. When querying, the search is performed for each segment of each spatial recording individually to compute a similarity score. For example, the similarity score can be defined as a value between 0 and 1. In some implementations, the querying module 350 can send a request to perform a query in the recordings database 345 and the recordings database 345 can return query results. The returned results in the querying module 30 can be populated as results in a spatial clips 340 space. The spatial clips 340 can be populated with segments available for display at the user interface 330. In some implementations, the number of spatial clips that can be displayed at one time through the user interface 330 can be limited to a predefined number, such as four (e.g., as shown on FIG. 2C). The display of the results from the query can be provided in a radial layout that can be navigated to show subsequent sets of results (e.g., sets of four segments) at one time to the user or in other formats.

In some implementations, the querying module 350 can obtain query results from the recordings database 345 and can filter those results to determine one or more results that have at least a minimum similarity score of 0.5. The result similarity score can be shown together with the spatial clips 340 when they are presented in the layout, e.g., radial layout.

In some implementations, a spatial clip that has the highest similarity score and can be ranked higher can be shown to the user 301 as a spatial clip with layout, toolbars, additional data, an avatar inside the space, etc., while the remaining clips (e.g., three more clips) can appear as image previews that can be navigated to by the user and expanded and reviewed in a similar manner as the first-ranked result. In some implementations, the user 301 can browse clips displayed through the user interface 330, for example, via interactions performed using the touch controllers 325.

In some implementations, a voice search can be implemented at the platform engine 305 to allow a search based on provided conversation recordings during search initiation in the search cube 335. In some implementations, the user can provide a search phrase where keywords can be identified and used to match those keywords with events in one of more of the recordings, for example, recordings obtained at the query module 350 after executing a search without considering the voice input or by incorporating the voice input as part of the query that is sent from the search cube 335 to the querying module 350 and further to the recordings database 345 to obtain a match. When a conversation-based search is implemented, a search phrase can be converted from voice input (e.g., voice instruction) and the recorded conversation part of a spatial recording can be turned into sentence embeddings. The voice instruction can be considered as input that is to be converted into a transcription including word phrases that upon processing are used for constructing query statements to be included in the query. The voice instruction can include speech that defines an association between an object of the objects (e.g., a physical object or an avatar of a recorded person).

Thus the search phrase and the sentence embeddings can be matched to compute similarity scores (e.g., Cosine similarity score) to return a score value that can be used to determine whether the spatial recording is a match for the query including voice input. In some instances, the sentence embeddings determined based on spatial recordings from the recordings database 345 can be stored in the recordings database 345, in connected storage within or outside of the platform engine 305. Alternatively or additionally, the whole process of dividing the recordings into sentence embeddings can be outsourced to an external component which can use the recordings from the recordings database as input that can be processed. The sentence embeddings can be stored externally to the recordings database, and optionally also externally to the platform engine 305. The sentence embeddings can be maintained in storage that can be queried by the querying module 350 when a query including voice input is received, to provide search terms from the voice input and to receive query results based on matches with sentence embeddings determined from the recordings in the recordings database 345.

In some implementations, a search defined through the search cube 335 can be based on different techniques including object search, viewpoint search, proximity search, voice search, or a combination of multiple techniques. Based on the different techniques used to search, different sets of segments from spatial recordings can be identified and these will have different computed similarity scores since these scores evaluate different aspects of similarity.

In some implementations, users (e.g., user 301) can combine different active querying techniques to perform a query through the search cube 335. When techniques are combined, the overall similarity score can be computed as an average of scores for the techniques used. For example, since proximity search is based on objects in the search cube and their relative distance from one another, running a proximity query can also incorporate object relationships as considered in an object search, where results of the proximity search can include returning a search result that can be scored as an average for matching based on object search considerations and proximity search considerations. Further and for example, viewpoint searches can also be considered to combine different aspects which can include both object search considerations and proximity search considerations, or just one of these in addition to the viewpoint. Thus, when a search is performed, the similarity score and the ranking can be based on considerations for a combined result related to one technique or a combination of related techniques. In cases where multiple search considerations are taken into account, a combined score can be computed as an average of the scores computed for each of the considered search techniques, e.g., average of object and proximity scores.

In some implementations, the platform engine 305 can also support the execution of passive querying which leverages user activity and object relationships as copied (or mirrored) into the search cube 335 to find relevant clips as matches from the recordings database and present them as spatial clips 340 to the user 301. In some implementations, when passive querying techniques are applied, the user activity in the related environments from which the activity is copied can be aggregated over predefined time intervals, e.g., over fifteen-second intervals. The aggregated data for the activities within the time span as defined can be used to search through the querying module 350 for relevant clips in the recordings database 345 (or another related database that includes spatial recordings that are split into clips of predefined length). In some instances, the query module 350 can perform querying to determine whether there are similar events (e.g., object and a recorded person interacting, object is included in a scene, objects are repositioned, etc.) and/or objects which are part of a segment from at least one of the spatial recordings in the recordings database 345. The querying module 350 can execute logic to find relevant clips (or segments) by checking segments of recordings in the recordings database 345 and determining if (1) similar events occurred (e.g., event search), (2) similar objects and their relationships were in the scene (e.g., object search), and (3) whether a recorded person was near these objects (proximity search). In some implementations, the query module 350 can use one or more of these three considerations when determining matching segments, where each of these three considerations can be used to score segments (and spatial recordings) to produce a total score as an average of the computed scores. The search can be performed based on consideration of the viewpoint of a single user recorded performing actions or of multiple perspectives when the recording includes multiple avatars representing recorded people and segments with multiple people can be searched.

In some implementations, upon receiving a query request at the query module 350, the querying module 350 can transfer the request to the recordings database and/or other databases in a query-defined schedule, such as sending queries every 5 seconds to avoid overloading the recordings database with queries. Three scores are averaged to produce a total score per recorded person. When there are multiple recorded persons in a segment, the person with the highest score can define the segment's score. The query can run every 5 seconds to avoid system overload.

Figure 4A:
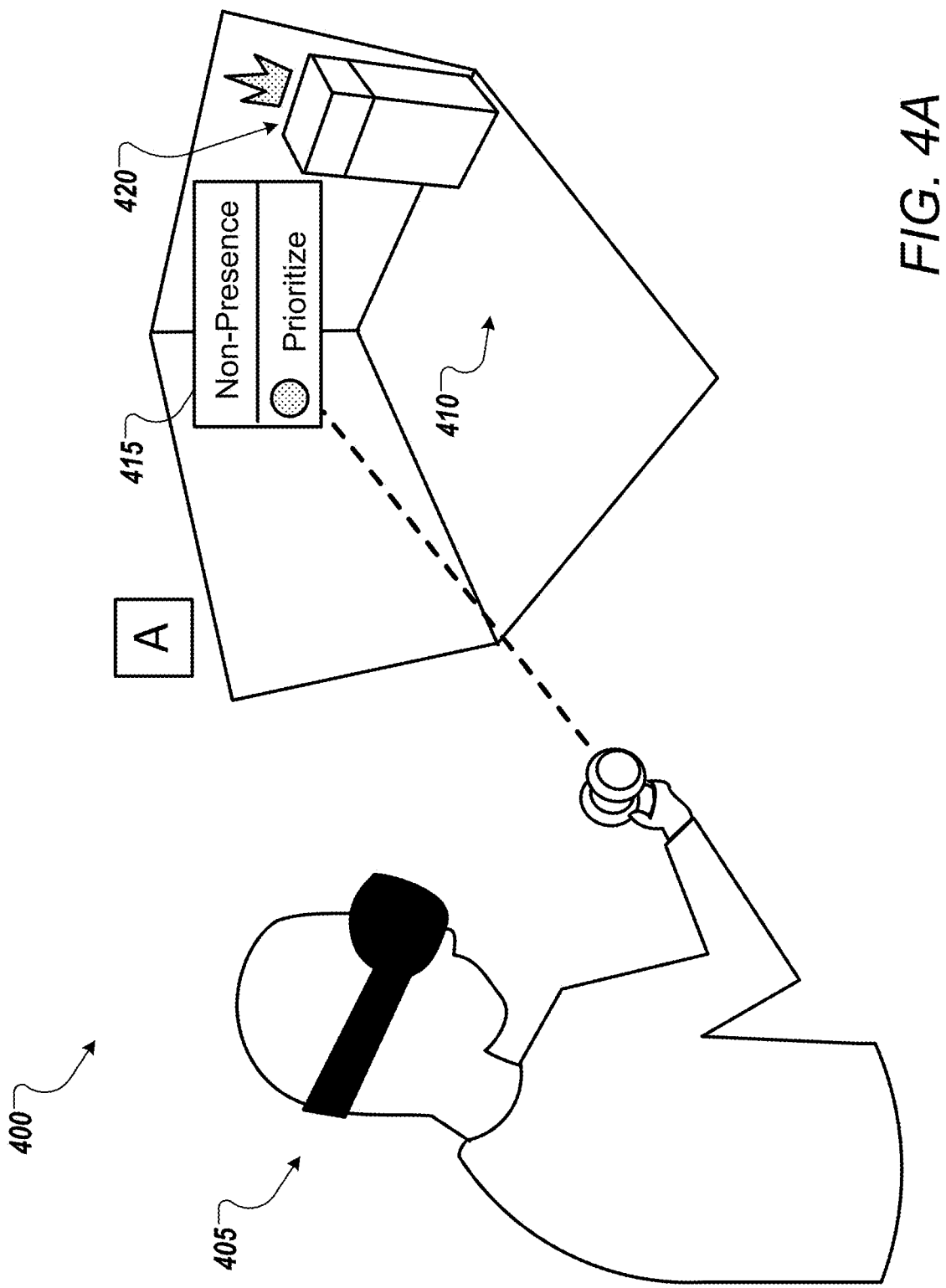
FIG. 4A shows an example of a process to execute an object search based on 3D space input received at a visual programming interface, wherein the input includes manual definition of relationships between objects in the 3D space in accordance with implementations of the present disclosure.

FIG. 4A shows an example of a process 400 to execute an object search based on 3D space input received at a virtual programming interface 410, wherein the input includes a manual definition of relationships between objects in the 3D space in accordance with implementations of the present disclosure. A user 405 can use a VR toolset including a VR headset and controllers (similar to the described VR toolset 310 of FIG. 3). For example, the user 405 can add an object such as a fridge 420 into the 3D space provided through the visual programming interface 410. The added objects in the 3D space become part of the query based on their presence in the 3D space. The interpretation of the query in relation to these objects can be based on their position within the 3D space, relative positioning to other objects or users, and other properties or characteristics that can be identified for the objects (e.g., through menu drop-down lists to select properties, through voice commands, etc.)

The user 405 can define manual relationships between objects in the visual programming interface 410. For example, the visual programming interface 410 can provide a menu 415 where the user can define an inclusion (or presence) status for the object 420, for example, "to be included" (required to be present) or "non-presence" (to be not existing in result segments based on the query). Further, the user 405 can define a priority status (e.g., defined according to a priority scale, as a predefined list of priority, as a binary option, among other example status configurations) for an object added in the 3D space for defining a query. The user can define whether the object, such as the fridge 420 should be prioritized when executing a search. For example, an object that is prioritized can be considered more important than objects that are not prioritized, and thus such prioritization can affect the calculation of similarity scores for retrieved.

FIG. 4B shows an example of process 430 to execute an object search based on automatic detection of relationships between objects input in a 3D space of a visual programming interface that provides a virtual environment for receiving input for constructing a query in accordance with implementations of the present disclosure. In some implementations, based on input provided by a user 435 into the visual programming interface 440, automatic detection of the relationships between objects can be identified. For example, the interface 440 can automatically detect whether two objects placed in the 3D space have a particular spatial orientation. In some implementations, the spatial orientation can be categorized in a predefined set of categories identifying relative positioning of two objects. For example, the interface can interpret the objects positioning to classify the spatial orientation as next to each other, or as across from each other, among other example spatial orientations that can be identified between two objects in a 3D space.

For example, the user 435 can place a stove 441 and a fridge 442 across each other in the 3D space of the visual programming interface 440. The user 435 can perform the placing of the objects user a VR controller to trigger insertion of objects from the real world into the 3D space. The interface 440 can detect the positions of these objects and can determine automatically a distance 445 between these objects. Similarly, if the user added further objects in the 3D space, as shown at 450, the distance between objects can be automatically determined. Further, based on analysis of the input objects in the 3D space, the spatial orientation between the objects can be automatically identified, e.g., "across each other."

In some implementations, the user 435 can further customize the presence of an object, such as the stove 441 and/or the fridge 442 in the search query. For example, the user 435 can interact through the controller(s), e.g., by pressing a grip button on the controller, to open a menu for an object (as shown in FIG. 4A), and define object-to-object relationships between objects. For example, the user 435 can use different colors for assigning the spatial relationship between objects, such as, using a connection in blue to define a "next-to" spatial orientation between two connected objects with a blue line, or using a connection in another color such as pink for connecting two objects to define an "across-from" spatial orientation. There can be other techniques to identify the spatial orientation of the objects which can be either explicitly provided by the user 435 or can be automatically detected based on the interactions of the user with objects in the 3D space. The user 435 can also toggle an object to define that the object is to be excluded from presence in a result from the query or that the object should be prioritized for its presence in the result from the query.

Figure 5A:
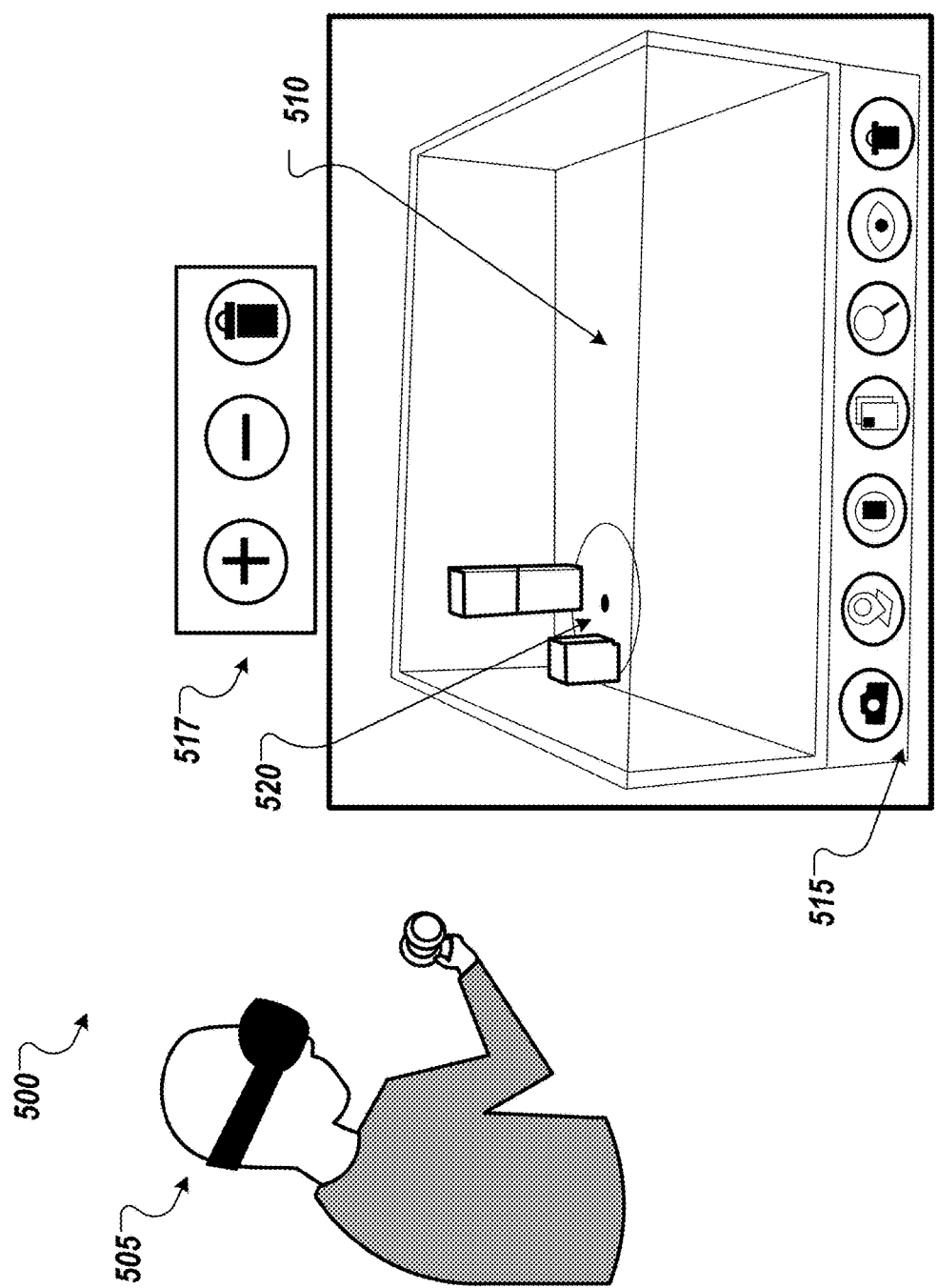
FIG. 5A shows an example of a process to use a proximity search technique based on identifying relative proximity of objects to an avatar navigating in a 3D space displayed via a visual programming interface in accordance with implementations of the present disclosure.

FIG. 5A shows an example of a process 500 to use a proximity search technique based on identifying the relative proximity of object(s) to an avatar navigating into a 3D space displayed in a visual programming interface 510 in accordance with implementations of the present disclosure. In some implementations, an interface 510 can be provided that can substantially correspond to the visual programming interface discussed throughout this disclosure.

A user 505 can interact with a 3D space of the interface 510 to define a 3D scene that can be used as input for constructing a query. The querying can be based on proximity techniques. The user 505 can define relative proximity between an avatar (defined as area 520) on the bottom surface of the 3D space (e.g., a cube) and an object or two in the 3D space. The user can define such proximity based on interactions with the interface 510 through the VR controllers he uses to navigate and modify content in the 3D space. The defined proximity between the avatar and the object is used to perform a query, where a query result would be determined to match the relative proximity between the avatar and one or more of the objects as in the 3D space with such proximity in segments of spatial recordings in a 3D database, such as the 3D database on FIG. 1 or the recordings database 345 of FIG. 3.

In some implementations, by applying proximity search techniques, the user can find segments of spatial recording where an avatar of a recorded person is in proximity to specific objects and potentially can be in interaction with them. For example, the user 505 can activate a proximity search by pressing a location icon in the toolbar 515 which spawns an area 520 (e.g., resizable disk area) placed inside the 3D space denoting an area that includes the objects adjacent (in close proximity) to the person. The proximity search can be executed based on considerations of the relative proximity between the recorded person (avatar) and surrounding objects (e.g., two objects across each other). In some implementations, the user 505 can define and/or modify the search input through interactive tools, such as the interactive tools included in toolbox 517. For example, with the "+" the user 505 can modify the area 520 to enlarge it, with the "−" the area 520 can be made smaller, and with the latest button (presented as a recycling bin), the area 520 can be completely deleted. In some implementations, the toolbox 517 can include additional and/or alternative options to modify the area 520 which can be presented on the interface 510 with other user interface icons (e.g., icons with tooltips, or text like icons, icons identifying the dimensional change of the area (e.g., 25% larger), or other image icons from those at 517).

Figure 5B:
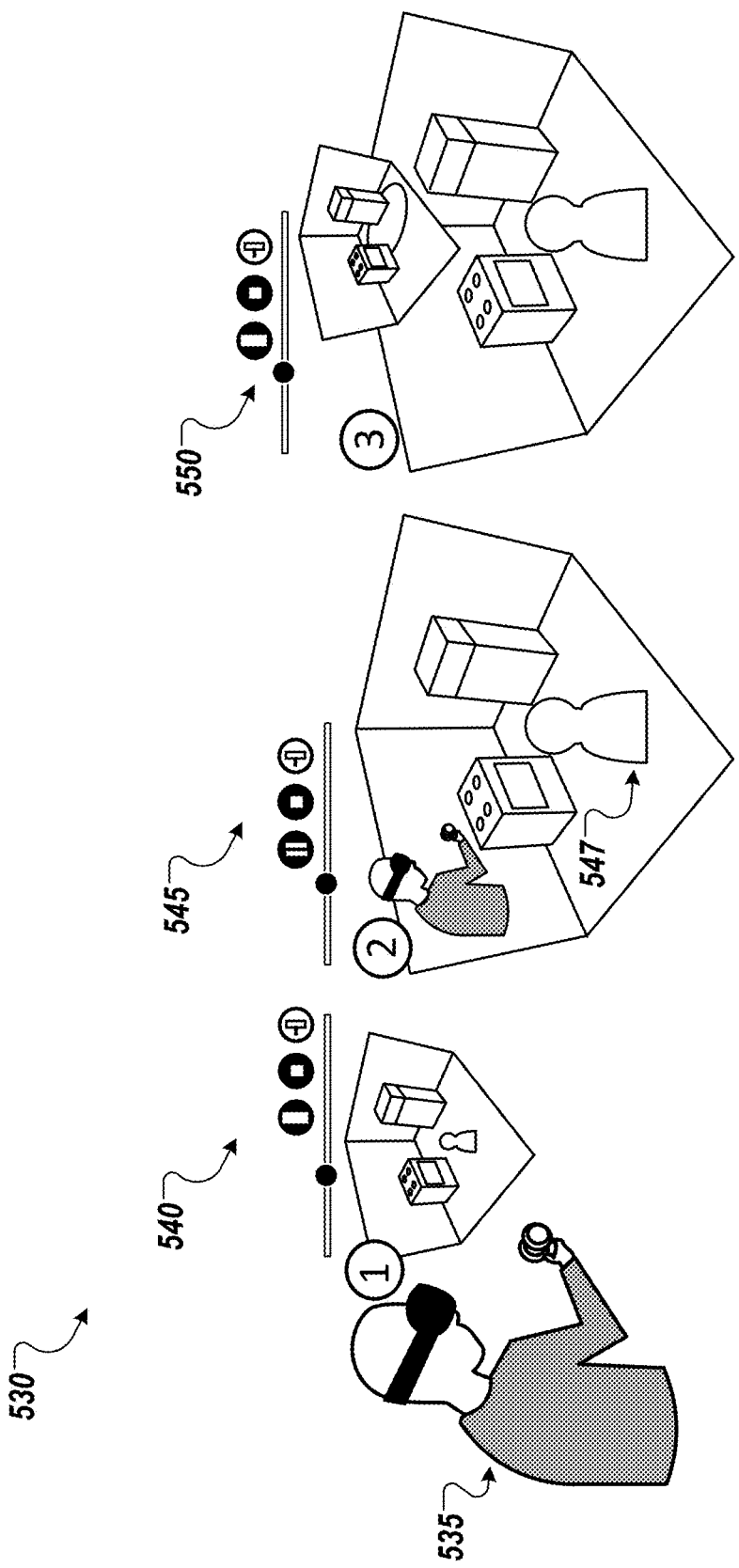
FIG. 5B shows an example of a process to use proximity search techniques by modifying a copied spatial recording identified through a previous query of spatial recordings in accordance with implementations of the present disclosure.

FIG. 5B shows an example of a process 530 to use proximity search techniques by modifying a copied spatial recording identified through a previous query of spatial recording in accordance with implementations of the present disclosure. In some implementations, proximity search techniques can be used in the context of reusing a retrieved query result to define a subsequent query for execution. In some implementations, a user 535 can execute a query and obtain a query result that can be copied in the visual programming interface, as shown at 540. The query result can be obtained based on implementing one or more of the search techniques described herein and not limited to relying on proximity search techniques alone. The user 535 can navigate to the retrieved result segment in the interface (545) and then copies a portion or the whole content from the search result into the 3D space of the interface at 550. In some implementations, the user 535 can navigate through the result segment by viewing, pausing, stopping, teleporting into the content in the 3D space (e.g., into a special recording with 1:1 scale presentation).

In some implementations, by copying the segment 540 that represents a room with two objects in certain proximity to an avatar (positioned in the middle) into the interface at 550, the 3D space in the visual programming interface can change into an actual room-shaped space, enabling absolute proximity which incorporates the absolute position of the recorded person (disk center) 547 in addition to the relative distance to surrounding objects. Thus, the user 535 can be provided with tools to find spatial recordings or segments thereof where a recorded person is standing (or located) at a particular location and in a defined proximity to other objects in the 3D space.

FIG. 6 shows an example of a process 600 to execute viewpoint search techniques associated with multiple viewpoints in accordance with implementations of the present disclosure. In some implementations, viewpoint search techniques can be used together with one or more other search techniques or as a standalone technique for determining spatial clips (e.g., segments from spatial recordings) that match an input in a 3D space of a visual programming interface.

In some implementations, viewpoint techniques for searching can be used when two users are interacting with a 3D space, and they have two different viewpoints. At 610, two users are identified as two cameras, 611 and 612, to represent two avatars representing recorded people looking at a fridge and a stove, respectively. The input at 610 can be used to search for spatial recordings or portions thereof that match the identified viewpoints of two avatars in relation to two objects. A further number of avatars and objects may be used as input to a query to be executed for finding matching search results considering viewpoints.

At 620, the two cameras 621 and 622, represent a single user who has his avatar change positions over time and thus change his view at respective time points, where first, the avatar is looking 621 at the stove and second, the avatar is looking 622 at a fridge. Viewpoint search allows a user to find segments of spatial recordings where avatars representing recorded people are looking at specific objects over time, e.g., in a specific sequence. The execution of the viewpoint search can be triggered by pressing a camera button on a toolbar provided by the visual programming interface, as shown at toolbar 635 of a user visual reality interface 630. The user can add a viewpoint as a proxy for a recorded person shown as a camera (at 610, 620, and in 630).

In some implementations, the visual reality interface 630 can also include interactive tools as presented at toolbar 637, where such tools can include options to add a new camera, add a new frame, delete all cameras and frames, identify a first frame that has been added for a particular scene and/or search. Other visualization of the tools within the toolbar 637 can be possible, or additional tool options to adjust the input for the search execution.

In some implementations, the visual programming interface can support multiple viewpoints serving as a proxy for multiple avatars to add different viewpoints towards different or all of the objects in the 3D space provided by the visual programming interface. In some implementations, each viewpoint position and orientation can be manipulated by using the pointing tools and the thumb stick on a VR controller used by the user to define the input for the query. In some cases, users can fine-tune the orientation of their avatars by performing movements with their heads that can be recognized by a VR headset worn by the users, or through other sensors that can capture head movements.

In some implementations, when a viewpoint is added in the 3D space to define a query, the interface can automatically add a frame in time associated with that viewpoint of that avatar. More frames can be recorded once a user has performed movements of the head or other instructions to change the viewpoint (e.g., pressing a frame button on the viewpoint toolbar or using a button on a controller). The technique supports the addition of any number of viewpoints and frames, which allows the user to search for segments of spatial recordings that can include multiple people who may or may not be moving around the 3D space. When a user defines a viewpoint, the user can provide a position and orientation of the viewpoint. That can be defined explicitly by the user, or can be automatically detected by the interface based on positioning and orientation of a camera (e.g., the camera can be associated with a viewpoint, and moving around the camera can be interpreted as moving the viewpoint).

Figure 7:
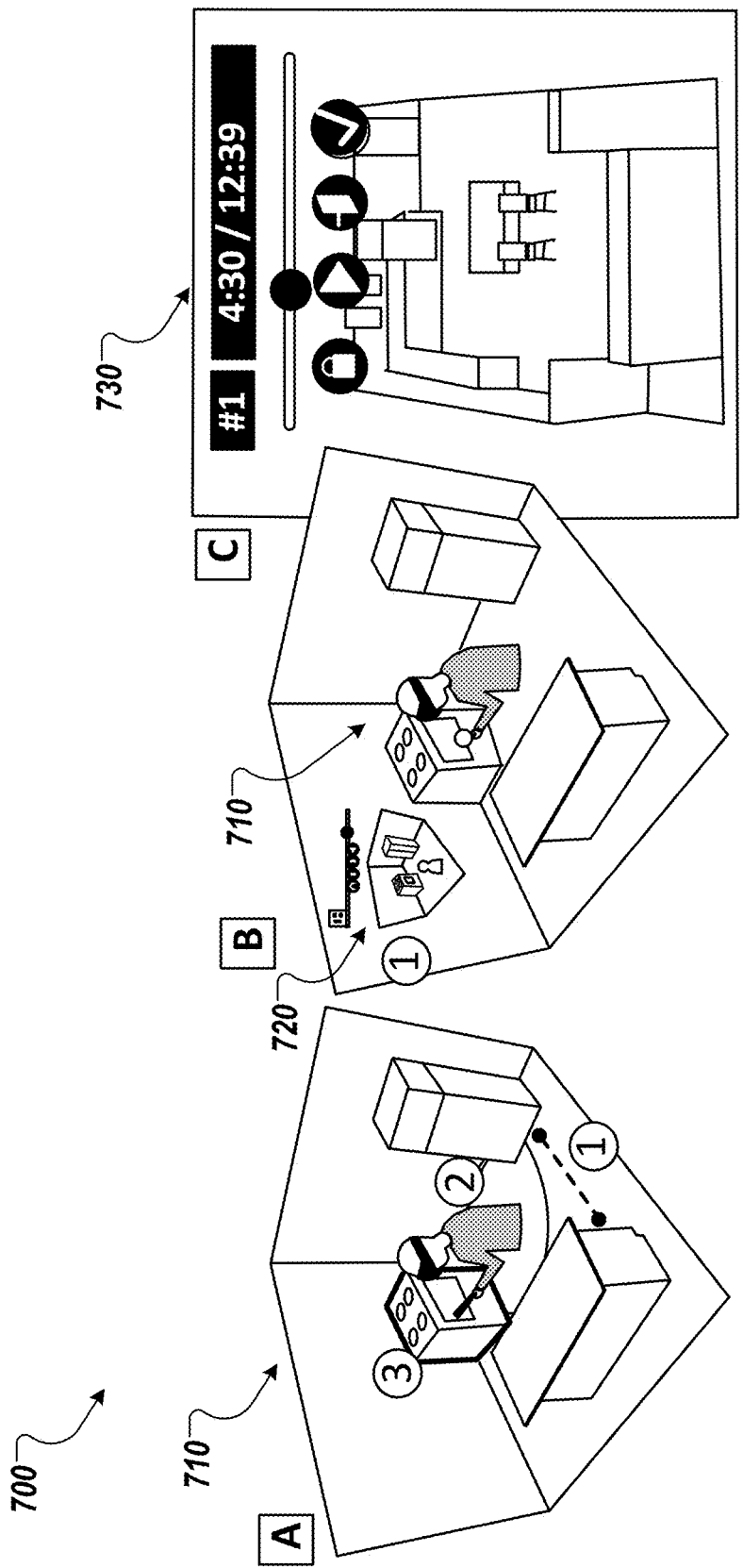
FIG. 7 shows an example of a process for executing passive querying of a 3D database with spatial recordings based on information from user's activities and environmental content for defining the passive query in accordance with the present disclosure.

FIG. 7 shows an example of a process for executing passive querying of a 3D database with spatial recordings based on information from the user's activities and environmental content for defining the passive query in accordance with the present disclosure. In some implementations, passive querying can be executed in the context of a system as described in relation to FIG. 1. The passive querying can be performed in the context of a designer who works alone or in a group to provide a design model (e.g., interior design), where the definition of the objects within the design model can be replicated in a visual programming interface to be interpreted as input (in passive form) to execute a query at a 3D database storing spatial recordings. The process 700 can use information about the user's activity and environmental content from a design space, such as the designed model 710, to replicate the design model into a visual programming interface 720 to initiate a query execution. The design model 710 can include objects with their spatial orientation, and/or viewpoints consideration provided from the viewpoint of the user and the proximity of his avatar to one or more of the objects included in the design model. The design model 710 can be generated in a VR environment, or in another 3D environment providing design tools to build a design model.

Based on copying the design model in the visual programming interface 720, a search can be automatically triggered and a search result that matches the input in the visual programming interface can be displayed (at 730) together with menu options to preview, navigate, or copy in the visual programming interface for further use and modifications.

In some implementations, passive querying can work by mirroring a user's design context (e.g., environment and/or activity of the user as an avatar in the environment or movement of objects within the environment) and implicitly querying for segments from recordings (spatial recordings) with similar designs. The execution of the querying and the retrieval of the result segments can be used to inform design decisions and considerations from past recordings stored in the queried database. In some implementations, unlike active querying where multiple results can be provided, e.g., in a radial layout as shown in FIG. 2C, only a single result need be shown to focus on a most relevant result matching the design activities. In some implementations, the user can be provided with the option to lock or hold a result and pause the query execution after a single result segment is provided. Such pause can optimize the query execution and reduce the resource expenditures for querying.

Figure 8:
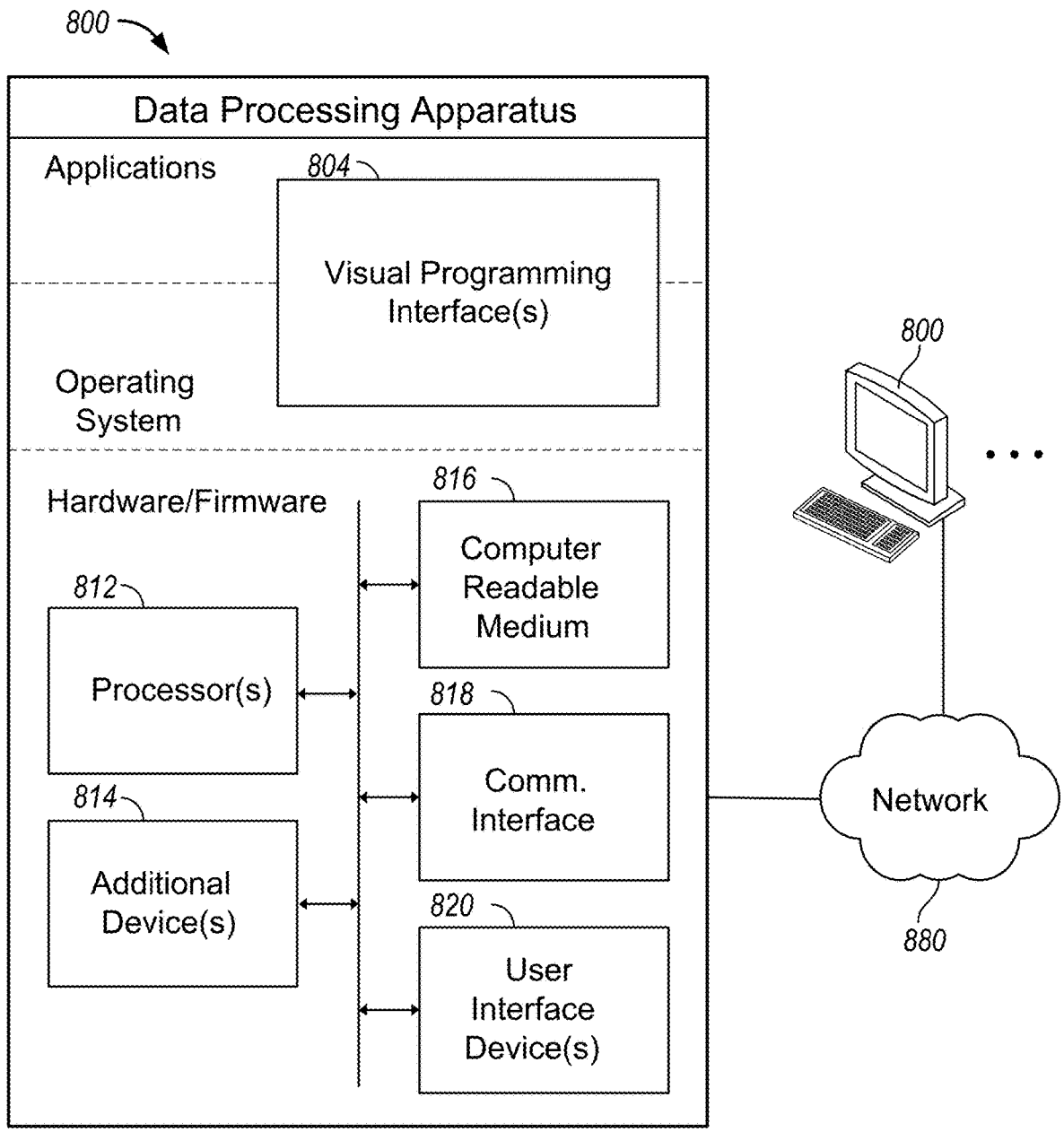
FIG. 8 is a schematic diagram of a data processing system including a data processing apparatus, which can be programmed as a client or as a server.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including visual programming interface(s) 804 that provide tools and techniques to support execution of queries at a 3D database that provides spatial recording in accordance with implementations of the present application. The number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses the communication interface 818 to communicate with one or more computers 890, for example, over the network 880. Examples of user interface devices 820 include a display, a camera, a speaker, a microphone, a tactile feedback device, a keyboard, a mouse, and VR and/or AR equipment. The data processing apparatus 800 can store instructions that implement operations associated with the program(s) described above, for example, on the computer readable medium 816 or one or more additional devices 814, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD) device, an organic light emitting diode (OLED) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

EXAMPLES

Although the present application is defined in the attached claims, it should be understood that the present invention can also (additionally or alternatively) be defined in accordance with the following examples:

Example 1. A method comprising:
constructing a query based on input received at a three-dimensional (3D) space displayed at a visual programming interface, wherein the input includes positioning of objects at 3D positions within the 3D space over time, wherein the input defines at least one spatial orientation between at least two objects from the objects in the 3D space;
executing the query to search a database of 3D recordings to find at least one segment from at least one 3D recording that includes the at least two objects and matches the spatial orientation between the at least two objects, as defined in the input, at a specific point in time; and
presenting the at least one segment from the at least one 3D recording via the visual programming interface.

Example 2. The method of Example 1, comprising:
receiving the input through the visual programming interface as direct user interactions with the objects in the 3D space, wherein the 3D space is a search cube, wherein the direct user interactions are performed with each of the objects to position each object relative to the other object during construction of the query,
wherein the query is constructed based at least on extracting information for the 3D positions of the objects in the search cube.

Example 3. The method of claim 1, comprising:
receiving the input as a copy of a 3D scene defined outside of the 3D space in a design environment.

Example 4. The method of claim 1 or claim 3, comprises:
obtaining design operations performed by a user in a design space to be mirrored dynamically at the 3D space and to be used as the input for constructing the query.

Example 5. The method of Example 4, wherein the design operations are evaluated to identify a first viewpoint of the user in the design space to be mapped to a second viewpoint in the 3D space when mirroring the user design operations in the 3D space to construct the query, and
wherein constructing the query comprising constructing the query based on input including event information for objects added in the design 3D space that are mirrored in the 3D space, wherein the event information includes at least one of a spatial relationship between the objects, a proximity of the avatar to at least one of the objects, and event time data identifying when the user added a respective object into the 3D space.

Example 6. The method of any one of the preceding Examples, comprising:
receiving the input at the 3D space during a collaborative design processes where at least two users interact with respective sets of the objects, wherein each user of the at least two users interact with a respective set of objects from a respective user viewpoint of the 3D space to position and move the respective sets of objects in the 3D space over time;
wherein the query is defined from a viewpoint specified at the visual programming interface for constructing the query.

Example 7. The method of any one of the preceding Examples, wherein the method comprises:
receiving the input as a definition of a 3D scene in the 3D space, wherein the input comprises information for a respective relationship status of at least one of the objects with the 3D scene, wherein the relationship status defines either presence or absence of the object in the 3D scene.

Example 8. The method of any one of the preceding Examples, wherein constructing the query comprises:
identifying inclusion statuses for each of the objects provided in the 3D space, wherein at least one object has an inclusion status specifying that the at least one object is non-present in the 3D space;
categorizing the at least one spatial orientation between the at least two objects from the objects to an object-to-object relationship according to a predefined categorization mapping rule; and
wherein the query is constructed based on the identified inclusion statuses and object-to object relationships of objects identified with the input, and
wherein executing the query comprises:
filtering the 3D recording in the database to identify the at least one 3D recording that includes objects corresponding to objects provided with the input in the 3D space different from the at least one object that is with the non-present inclusion status, and
filtering the 3D recording in the database to identify the at least one 3D recording to include at least two objects corresponding to the at least two objects from the input, wherein the at least two objects in the at least one 3D recording are identified to match the object-to-object relationship categorizing the at least one spatial orientation between the at least two objects in the 3D space.

Example 9. The method of Example 8, wherein executing the query comprises:
  determining ranks for recordings of a set of 3D recording from the 3D database, wherein the set of 3D recordings match the inclusion statuses for each of the objects provided in the 3D space, wherein each rank of a recording is based on a similarity between the recording and the constructed query.

Example 10. The method of any one of the previous Examples, wherein constructing the query comprises:
  identifying priority statuses for each of the objects provided in the 3D space to be applied during searching of the 3D recording in the database.

Example 11. The method of any one of the previous Example, wherein the method comprises:
  receiving the input at the 3D space, wherein the input comprises a desired proximity between respective 3D positions of the at least two objects.

Example 12. The method of any one of the previous Examples, comprising:
  receiving a subsequent input from a user to select a first segment of a 3D recording from the at least one segment of the at least one 3D recording that comprise the at least two objects defined in the query and match the spatial orientation between the at least two objects as defined in the input;
  mirroring the selected first segment into the 3D space of the visual programming interface;
  receiving a modification instruction at the 3D space as new input to query the 3D database, wherein the modification instruction is for modifying a position of at least one object comprised in the mirrored first segment in the 3D space; and
  constructing a new query using the new input received for the mirrored first segment into the 3D space, wherein the query is constructed based on considering i) spatial orientation and distance between objects from the first segment and ii) absolute positioning of the objects from the first segment in the 3D space; and
  executing the new query to identify one or more segments from one or more 3D recordings in the 3D database that match the query according to a threshold similarity level.

Example 13. The method of any one of the previous Examples, wherein the 3D space is displayed with a first viewpoint, and the input defines the spatial orientation between the at least two objects from a second viewpoint, the second viewpoint being of an avatar of a user providing the input,
  wherein constructing the query comprises converting the spatial orientation between the at least to objects to a new spatial orientation with respect to the first viewpoint of the 3D space, and wherein presenting the at least one segment comprises presenting the at least one segment to match the first viewpoint of the 3D space.

Example 14. The method of Example 13, wherein the method comprises:
  receiving the input, wherein the input identifies an avatar as a first object defined for the query that is associated with a second viewpoint and a second spatial orientation towards an object of the at least two objects, wherein the second spatial orientation is associated with a different time point in the query compared to a first time point matching the new spatial orientation of the at least two objects.

Example 15. The method of any one of the previous Examples, wherein the method comprises:
  receiving input comprising a voice instruction input specifying addition or exclusion of objects in the 3D space of the visual programming interface for constructing the query, wherein the voice instructions specify a 3D position of an object in the 3D space that is to be added; and
  converting the voice instruction input into a transcription including word phrases that upon processing are used for constructing query statements to be included in the query, the voice instruction comprising speech that defines an association between an object of the objects.

Similar operations and processes as describes in Examples 1 to 15 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 15 can also be implemented.

What is claimed is:

1. A method comprising:
  receiving input for a three-dimensional (3D) space displayed at a visual programming interface, the input defining positioning of objects at 3D positions within the 3D space over a period of time, and the input defining at least one spatial orientation between at least two objects from the objects in the 3D space;
  constructing a query based on the input including the positioning of the objects at the 3D positions within the 3D space over the period of time and including the at least one spatial orientation between the at least two objects from the objects in the 3D space;
  executing the query to search a database of 3D recordings to find at least one segment from at least one 3D recording that includes the at least two objects and matches the spatial orientation between the at least two objects, as defined in the input, at a specific point in time; and
  presenting the at least one segment from the at least one 3D recording via the visual programming interface.

2. The method of claim 1, wherein the receiving comprises:
  receiving the input through the visual programming interface as direct user interactions with the objects in the 3D space, wherein the 3D space is a search cube, wherein the direct user interactions are performed with each of the objects to position each object relative to the other object during construction of the query,
  wherein the query is constructed based at least on extracting information for the 3D positions of the objects in the search cube.

3. The method of claim 1, wherein the receiving comprises:
  receiving the input as a copy of a 3D scene defined outside of the 3D space in a design environment.

4. The method of claim 1, wherein the receiving comprises:
obtaining design operations performed by a user in a design space to be mirrored dynamically at the 3D space and to be used as the input for constructing the query.

5. The method of claim 4, wherein the design operations are evaluated to identify a first viewpoint of the user in the design space to be mapped to a second viewpoint in the 3D space when mirroring the user design operations in the 3D space to construct the query, and
wherein constructing the query comprising constructing the query based on input including event information for objects added in the design 3D space that are mirrored in the 3D space, wherein the event information includes at least one of a spatial relationship between the objects, a proximity of an avatar to at least one of the objects, and event time data identifying when the user added a respective object into the 3D space.

6. The method of claim 1, wherein the receiving comprises:
receiving the input at the 3D space during a collaborative design process where at least two users interact with respective sets of the objects, wherein each user of the at least two users interact with a respective set of objects from a respective user viewpoint of the 3D space to position and move the respective sets of objects in the 3D space over time;
wherein the query is defined from a viewpoint specified at the visual programming interface for constructing the query.

7. The method of claim 1, wherein the receiving comprises:
receiving the input as a definition of a 3D scene in the 3D space, wherein the input comprises information for a respective relationship status of at least one of the objects with the 3D scene, wherein the relationship status defines either presence or absence of the object in the 3D scene.

8. The method of claim 1, wherein constructing the query comprises:
identifying inclusion statuses for each of the objects provided in the 3D space, wherein at least one object has an inclusion status specifying that the at least one object is non-present in the 3D space;
categorizing the at least one spatial orientation between the at least two objects from the objects to an object-to-object relationship according to a predefined categorization mapping rule; and
wherein the query is constructed based on the identified inclusion statuses and object-to object relationships of objects identified with the input, and
wherein executing the query comprises:
filtering the 3D recording in the database to identify the at least one 3D recording that includes objects corresponding to objects provided with the input in the 3D space different from the at least one object that is with the non-present inclusion status, and
filtering the 3D recording in the database to identify the at least one 3D recording to include at least two objects corresponding to the at least two objects from the input, wherein the at least two objects in the at least one 3D recording are identified to match the object-to-object relationship categorizing the at least one spatial orientation between the at least two objects in the 3D space.

9. The method of claim 8, wherein executing the query comprises:
determining ranks for recordings of a set of 3D recording from the 3D database, wherein the set of 3D recordings match the inclusion statuses for each of the objects provided in the 3D space, wherein each rank of a recording is based on a similarity between the recording and the constructed query.

10. The method of claim 1, wherein constructing the query comprises:
identifying priority statuses for each of the objects provided in the 3D space to be applied during searching of the 3D recording in the database.

11. The method of claim 1, wherein the receiving comprises:
receiving the input at the 3D space, wherein the input comprises a desired proximity between respective 3D positions of the at least two objects.

12. The method of claim 1, comprising:
receiving a subsequent input from a user to select a first segment of a 3D recording from the at least one segment of the at least one 3D recording that comprise the at least two objects defined in the query and match the spatial orientation between the at least two objects as defined in the input;
mirroring the selected first segment into the 3D space of the visual programming interface;
receiving a modification instruction at the 3D space as new input to query the 3D database, wherein the modification instruction is for modifying a position of at least one object comprised in the mirrored first segment in the 3D space; and
constructing a new query using the new input received for the mirrored first segment into the 3D space, wherein the query is constructed based on considering i) spatial orientation and distance between objects from the first segment and ii) absolute positioning of the objects from the first segment in the 3D space; and
executing the new query to identify one or more segments from one or more 3D recordings in the 3D database that match the query according to a threshold similarity level.

13. The method of claim 1, wherein the 3D space is displayed with a first viewpoint, and the input defines the spatial orientation between the at least two objects from a second viewpoint, the second viewpoint being of an avatar of a user providing the input,
wherein constructing the query comprises converting the spatial orientation between the at least to objects to a new spatial orientation with respect to the first viewpoint of the 3D space, and wherein presenting the at least one segment comprises presenting the at least one segment to match the first viewpoint of the 3D space.

14. The method of claim 13,
wherein the input identifies an avatar as a first object defined for the query that is associated with a second viewpoint and a second spatial orientation towards an object of the at least two objects, wherein the second spatial orientation is associated with a different time point in the query compared to a first time point matching the new spatial orientation of the at least two objects.

15. The method of claim 1, wherein the receiving comprises:
receiving a voice instruction input specifying addition or exclusion of objects in the 3D space of the visual programming interface for constructing the query, wherein the voice instruction input specifies a 3D position of an object in the 3D space that is to be added; and converting the voice instruction input into a transcription including word phrases that upon processing are used for constructing query statements to be included in the query, the voice instruction input comprising speech that defines an association between an object of the objects.

16. A system comprising:

one or more computers; and one or more storage devices on which are stored instructions that are operable, when executed by the one or more computers, to cause the one or more computers to perform operations comprising receiving input for a three-dimensional (3D) space displayed at a visual programming interface, the input defining positioning of objects at 3D positions within the 3D space over a period of time, and the input defining at least one spatial orientation between at least two objects from the objects in the 3D space, constructing a query based on the input including the positioning of the objects at the 3D positions within the 3D space over the period of time and including the at least one spatial orientation between the at least two objects from the objects in the 3D space, executing the query to search a database of 3D recordings to find at least one segment from at least one 3D recording that includes the at least two objects and matches the spatial orientation between the at least two objects, as defined in the input, at a specific point in time, and presenting the at least one segment from the at least one 3D recording via the visual programming interface.

17. The system of claim 16, wherein the receiving comprises:

receiving the input through the visual programming interface as direct user interactions with the objects in the 3D space, wherein the 3D space is a search cube, wherein the direct user interactions are performed with each of the objects to position each object relative to the other object during construction of the query, wherein the query is constructed based at least on extracting information for the 3D positions of the objects in the search cube.

18. The system of claim 16, wherein the receiving comprises:

receiving the input as a copy of a 3D scene defined outside of the 3D space in a design environment.

19. The system of claim 16, wherein the receiving comprises:

receiving the input as a definition of a 3D scene in the 3D space, wherein the input comprises information for a respective relationship status of at least one of the objects with the 3D scene, wherein the relationship status defines either presence or absence of the object in the 3D scene.

20. The system of claim 16, wherein the receiving comprises:

obtaining design operations performed by a user in a design space to be mirrored dynamically at the 3D space and to be used as the input for constructing the query.

21. The system of claim 20, wherein the design operations are evaluated to identify a first viewpoint of the user in the design space to be mapped to a second viewpoint in the 3D space when mirroring the user design operations in the 3D space to construct the query, and wherein constructing the query comprising constructing the query based on input including event information for objects added in the design 3D space that are mirrored in the 3D space, wherein the event information includes at least one of a spatial relationship between the objects, a proximity of an avatar to at least one of the objects, and event time data identifying when the user added a respective object into the 3D space.

22. The system of claim 16, wherein the receiving comprises:

receiving the input at the 3D space during a collaborative design process where at least two users interact with respective sets of the objects, wherein each user of the at least two users interact with a respective set of objects from a respective user viewpoint of the 3D space to position and move the respective sets of objects in the 3D space over time;

wherein the query is defined from a viewpoint specified at the visual programming interface for constructing the query.

23. The system of claim 16, wherein constructing the query comprises:

identifying inclusion statuses for each of the objects provided in the 3D space, wherein at least one object has an inclusion status specifying that the at least one object is non-present in the 3D space;

categorizing the at least one spatial orientation between the at least two objects from the objects to an object-to-object relationship according to a predefined categorization mapping rule; and wherein the query is constructed based on the identified inclusion statuses and object-to object relationships of objects identified with the input, and wherein executing the query comprises:

filtering the 3D recording in the database to identify the at least one 3D recording that includes objects corresponding to objects provided with the input in the 3D space different from the at least one object that is with the non-present inclusion status, and filtering the 3D recording in the database to identify the at least one 3D recording to include at least two objects corresponding to the at least two objects from the input, wherein the at least two objects in the at least one 3D recording are identified to match the object-to- object relationship categorizing the at least one spatial orientation between the at least two objects in the 3D space.

24. The system of claim 23, wherein executing the query comprises:

determining ranks for recordings of a set of 3D recording from the 3D database, wherein the set of 3D recordings match the inclusion statuses for each of the objects provided in the 3D space, wherein each rank of a recording is based on a similarity between the recording and the constructed query.

25. The system of claim 16, wherein constructing the query comprises:

identifying priority statuses for each of the objects provided in the 3D space to be applied during searching of the 3D recording in the database.

26. The system of claim 16, wherein the receiving comprises:

receiving the input at the 3D space, wherein the input comprises a desired proximity between respective 3D positions of the at least two objects.

27. The system of claim 16, wherein the operations comprise:
 receiving a subsequent input from a user to select a first segment of a 3D recording from the at least one segment of the at least one 3D recording that comprise the at least two objects defined in the query and match the spatial orientation between the at least two objects as defined in the input;
 mirroring the selected first segment into the 3D space of the visual programming interface;
 receiving a modification instruction at the 3D space as new input to query the 3D database, wherein the modification instruction is for modifying a position of at least one object comprised in the mirrored first segment in the 3D space; and
 constructing a new query using the new input received for the mirrored first segment into the 3D space, wherein the query is constructed based on considering i) spatial orientation and distance between objects from the first segment and ii) absolute positioning of the objects from the first segment in the 3D space; and
 executing the new query to identify one or more segments from one or more 3D recordings in the 3D database that match the query according to a threshold similarity level.

28. The system of claim 16, wherein the 3D space is displayed with a first viewpoint, and the input defines the spatial orientation between the at least two objects from a second viewpoint, the second viewpoint being of an avatar of a user providing the input,
 wherein constructing the query comprises converting the spatial orientation between the at least to objects to a new spatial orientation with respect to the first viewpoint of the 3D space, and wherein presenting the at least one segment comprises presenting the at least one segment to match the first viewpoint of the 3D space.

29. The system of claim 28, wherein the input identifies an avatar as a first object defined for the query that is associated with a second viewpoint and a second spatial orientation towards an object of the at least two objects, wherein the second spatial orientation is associated with a different time point in the query compared to a first time point matching the new spatial orientation of the at least two objects.

30. The system of claim 16, wherein the receiving comprises:
 receiving a voice instruction input specifying addition or exclusion of objects in the 3D space of the visual programming interface for constructing the query, wherein the voice instruction input specifies a 3D position of an object in the 3D space that is to be added; and
 converting the voice instruction input into a transcription including word phrases that upon processing are used for constructing query statements to be included in the query, the voice instruction input comprising speech that defines an association between an object of the objects.

31. A non-transitory computer-readable storage medium coupled to one or more processors and having instructions stored thereon which, when executed by the one or more processors, cause the one or more processors to perform operations comprising:
 receiving input for a three-dimensional (3D) space displayed at a visual programming interface, the input defining positioning of objects at 3D positions within the 3D space over a period of time, and the input defining at least one spatial orientation between at least two objects from the objects in the 3D space;
 constructing a query based on the input including the positioning of the objects at the 3D positions within the 3D space over the period of time and including the at least one spatial orientation between the at least two objects from the objects in the 3D space;
 executing the query to search a database of 3D recordings to find at least one segment from at least one 3D recording that includes the at least two objects and matches the spatial orientation between the at least two objects, as defined in the input, at a specific point in time; and
 presenting the at least one segment from the at least one 3D recording via the visual programming interface.

32. The non-transitory computer-readable storage medium of claim 31, wherein the receiving comprises:
 receiving the input through the visual programming interface as direct user interactions with the objects in the 3D space, wherein the 3D space is a search cube, wherein the direct user interactions are performed with each of the objects to position each object relative to the other object during construction of the query,
 wherein the query is constructed based at least on extracting information for the 3D positions of the objects in the search cube.

33. The non-transitory computer-readable storage medium of claim 31, wherein the receiving comprises:
 receiving the input as a copy of a 3D scene defined outside of the 3D space in a design environment.

34. The non-transitory computer-readable storage medium of claim 31, wherein the receiving comprises:
 obtaining design operations performed by a user in a design space to be mirrored dynamically at the 3D space and to be used as the input for constructing the query.

35. The non-transitory computer-readable storage medium of claim 34, wherein the design operations are evaluated to identify a first viewpoint of the user in the design space to be mapped to a second viewpoint in the 3D space when mirroring the user design operations in the 3D space to construct the query, and
 wherein constructing the query comprising constructing the query based on input including event information for objects added in the design 3D space that are mirrored in the 3D space, wherein the event information includes at least one of a spatial relationship between the objects, a proximity of an avatar to at least one of the objects, and event time data identifying when the user added a respective object into the 3D space.

36. The non-transitory computer-readable storage medium of claim 31, wherein the receiving comprises:
 receiving the input at the 3D space during a collaborative design process where at least two users interact with respective sets of the objects, wherein each user of the at least two users interact with a respective set of objects from a respective user viewpoint of the 3D space to position and move the respective sets of objects in the 3D space over time;
 wherein the query is defined from a viewpoint specified at the visual programming interface for constructing the query.

37. The non-transitory computer-readable storage medium of claim 31, wherein the receiving comprises:
 receiving the input as a definition of a 3D scene in the 3D space, wherein the input comprises information for a respective relationship status of at least one of the objects with the 3D scene, wherein the relationship status defines either presence or absence of the object in the 3D scene.

38. The non-transitory computer-readable storage medium of claim 31, wherein constructing the query comprises:
  identifying inclusion statuses for each of the objects provided in the 3D space, wherein at least one object has an inclusion status specifying that the at least one object is non-present in the 3D space;
  categorizing the at least one spatial orientation between the at least two objects from the objects to an object-to-object relationship according to a predefined categorization mapping rule; and
  wherein the query is constructed based on the identified inclusion statuses and object-to object relationships of objects identified with the input, and
  wherein executing the query comprises:
    filtering the 3D recording in the database to identify the at least one 3D recording that includes objects corresponding to objects provided with the input in the 3D space different from the at least one object that is with the non-present inclusion status, and
    filtering the 3D recording in the database to identify the at least one 3D recording to include at least two objects corresponding to the at least two objects from the input, wherein the at least two objects in the at least one 3D recording are identified to match the object-to- object relationship categorizing the at least one spatial orientation between the at least two objects in the 3D space.

39. The non-transitory computer-readable storage medium of claim 38, wherein executing the query comprises:
  determining ranks for recordings of a set of 3D recording from the 3D database, wherein the set of 3D recordings match the inclusion statuses for each of the objects provided in the 3D space, wherein each rank of a recording is based on a similarity between the recording and the constructed query.

40. The non-transitory computer-readable storage medium of claim 31, wherein constructing the query comprises:
  identifying priority statuses for each of the objects provided in the 3D space to be applied during searching of the 3D recording in the database.

41. The non-transitory computer-readable storage medium of claim 31, wherein the receiving comprises:
  receiving the input at the 3D space, wherein the input comprises a desired proximity between respective 3D positions of the at least two objects.

42. The non-transitory computer-readable storage medium of claim 31, wherein the operations comprise:
  receiving a subsequent input from a user to select a first segment of a 3D recording from the at least one segment of the at least one 3D recording that comprise the at least two objects defined in the query and match the spatial orientation between the at least two objects as defined in the input;
  mirroring the selected first segment into the 3D space of the visual programming interface;
  receiving a modification instruction at the 3D space as new input to query the 3D database, wherein the modification instruction is for modifying a position of at least one object comprised in the mirrored first segment in the 3D space; and
  constructing a new query using the new input received for the mirrored first segment into the 3D space, wherein the query is constructed based on considering i) spatial orientation and distance between objects from the first segment and ii) absolute positioning of the objects from the first segment in the 3D space; and
  executing the new query to identify one or more segments from one or more 3D recordings in the 3D database that match the query according to a threshold similarity level.

43. The non-transitory computer-readable storage medium of claim 31, wherein the 3D space is displayed with a first viewpoint, and the input defines the spatial orientation between the at least two objects from a second viewpoint, the second viewpoint being of an avatar of a user providing the input,
  wherein constructing the query comprises converting the spatial orientation between the at least to objects to a new spatial orientation with respect to the first viewpoint of the 3D space, and wherein presenting the at least one segment comprises presenting the at least one segment to match the first viewpoint of the 3D space.

44. The non-transitory computer-readable storage medium of claim 43, wherein the input identifies an avatar as a first object defined for the query that is associated with a second viewpoint and a second spatial orientation towards an object of the at least two objects, wherein the second spatial orientation is associated with a different time point in the query compared to a first time point matching the new spatial orientation of the at least two objects.

45. The non-transitory computer-readable storage medium of claim 31, wherein the receiving comprises:
  receiving a voice instruction input specifying addition or exclusion of objects in the 3D space of the visual programming interface for constructing the query, wherein the voice instruction input specifies a 3D position of an object in the 3D space that is to be added; and
  converting the voice instruction input into a transcription including word phrases that upon processing are used for constructing query statements to be included in the query, the voice instruction input comprising speech that defines an association between an object of the objects.

* * * * *

UNITED STATES PATENT AND TRADEMARK OFFICE
CERTIFICATE OF CORRECTION

PATENT NO. : 12,373,495 B2  
APPLICATION NO. : 18/085386  
DATED : July 29, 2025  
INVENTOR(S) : Karthik Mahadevan et al.

Page 1 of 1

It is certified that error appears in the above-identified patent and that said Letters Patent is hereby corrected as shown below:

In the Claims

Column 33, Line 52, in Claim 8: delete "object-to object" and insert --object-to-object--, therefor.

Column 34, Line 32, in Claim 12: after "space;" delete "and".

Column 34, Line 49, in Claim 13: delete "to objects" and insert --two objects--, therefor.

Column 36, Line 34, in Claim 23: delete "object-to object" and insert --object-to-object--, therefor.

Column 36, Line 47, in Claim 23: delete "object-to- object" and insert --object-to-object--, therefor.

Column 37, Line 15, in Claim 27: after "space;" delete "and".

Column 37, Line 32, in Claim 28: delete "to objects" and insert --two objects--, therefor.

Column 39, Line 16, in Claim 38: delete "object-to object" and insert --object-to-object--, therefor.

Column 39, Line 29, in Claim 38: delete "object-to- object" and insert --object-to-object--, therefor.

Column 40, Line 10 (approx.), in Claim 42: after "space;" delete "and".

Column 40, Line 28 (approx.), in Claim 43: delete "to objects" and insert --two objects--, therefor.

Signed and Sealed this  
Thirteenth Day of January, 2026

John A. Squires  
*Director of the United States Patent and Trademark Office*